US012573142B2

(12) United States Patent
Saucedo et al.

(10) Patent No.: US 12,573,142 B2
(45) Date of Patent: Mar. 10, 2026

(54) SPATIAL LOCALITY FOR FIRST-HIT RAY BVH TRAVERSALS

(71) Applicant: QUALCOMM Incorporated, San Diego, CA (US)

(72) Inventors: Alfredo Olegario Saucedo, San Diego, CA (US); Srihari Babu Alla, San Diego, CA (US); Adimulam Ramesh Babu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 254 days.

(21) Appl. No.: 18/364,417

(22) Filed: Aug. 2, 2023

(65) Prior Publication Data

US 2025/0046015 A1      Feb. 6, 2025

(51) Int. Cl.
*G06T 17/00*          (2006.01)
*G06T 15/06*          (2011.01)

(52) U.S. Cl.
CPC ............ *G06T 17/005* (2013.01); *G06T 15/06* (2013.01)

(58) Field of Classification Search
CPC ... G06T 17/005; G06T 15/06; G06T 2210/12; G06T 15/005
See application file for complete search history.

(56) References Cited

U.S. PATENT DOCUMENTS

2015/0302629 A1    10/2015  Obert et al.
2016/0292908 A1    10/2016  Obert

2017/0249779 A1     8/2017  Obert
2017/0374341 A1*   12/2017  Michail .................. G06T 19/00
2021/0366176 A1*   11/2021  Gillig ..................... G06T 15/04
2023/0097562 A1*    3/2023  Shkurko .............. G06T 3/4007
                                                          345/418
2024/0104824 A1*    3/2024  Gupta .................... G06T 17/10

OTHER PUBLICATIONS

Lufei Liu, et al. 2021. Intersection Prediction for Accelerated GPU Ray Tracing. In MICRO-54: 54th Annual IEEE/ACM International Symposium on Microarchitecture (MICRO '21). Association for Comuting Machinery, New York, NY, USA, 709-723. https://doi.org/10.1145/3466752.3480097 (Year: 2021).*
International Search Report and Written Opinion—PCT/US2024/038228—ISA/EPO—Oct. 10, 2024.

(Continued)

*Primary Examiner* — Said Broome
*Assistant Examiner* — Jordan Wan Yick
(74) *Attorney, Agent, or Firm* — Procopio, Cory, Hargreaves & Savitch LLP

(57)          ABSTRACT

This disclosure provides systems, devices, apparatus, and methods, including computer programs encoded on storage media, for exploiting spatial locality to speed up first-hit ray BVH traversals. A processor may generate a bounding volume hierarchy (BVH) hit map based a set of pixels, where the BVH hit map includes entries indicative of intersection information for a set of rays associated with the set of pixels, and where the BVH hit map corresponds to a BVH. The processor may select an entry from the entries of the BVH hit map based on pixel coordinate information for the set of pixels. The processor may traverse the BVH from a node of the BVH associated with the selected entry.

30 Claims, 15 Drawing Sheets

(56)            References Cited

OTHER PUBLICATIONS

Liu L., et al., "Intersection Prediction for Accelerated GPU Ray Tracing", Proceedings of the 1st Workshop on Digital Twin Edge AI for Industrial IoT, ACMPUB27, New York, NY, USA, Oct. 18, 2021, pp. 709-723, XP058992635, abstract, figures 3-7,9,10, section 2.2, section 2.4, section 2.5, section 3, paragraph 1 to 3, sections 4.1 to 4.3, section 5.1.6 Last paragraph, section 6.2.5.

* cited by examiner

100

400

Scene
Object 410

Pixels
420

450

Primary
Ray 484

Shadow Ray 482

Light
Source 480

Scene
Object 460

Pixels
470

Example 1 802 – BVH Traversal Logic

BVH Hit Map 1002

Pixel Block 1012

Provoking Pixel 1014

BVH Hit Map Entry 1006

Validity Indication 1008

BVH Node Identifier 1010

BVH Hit Map Entries 1004

1000

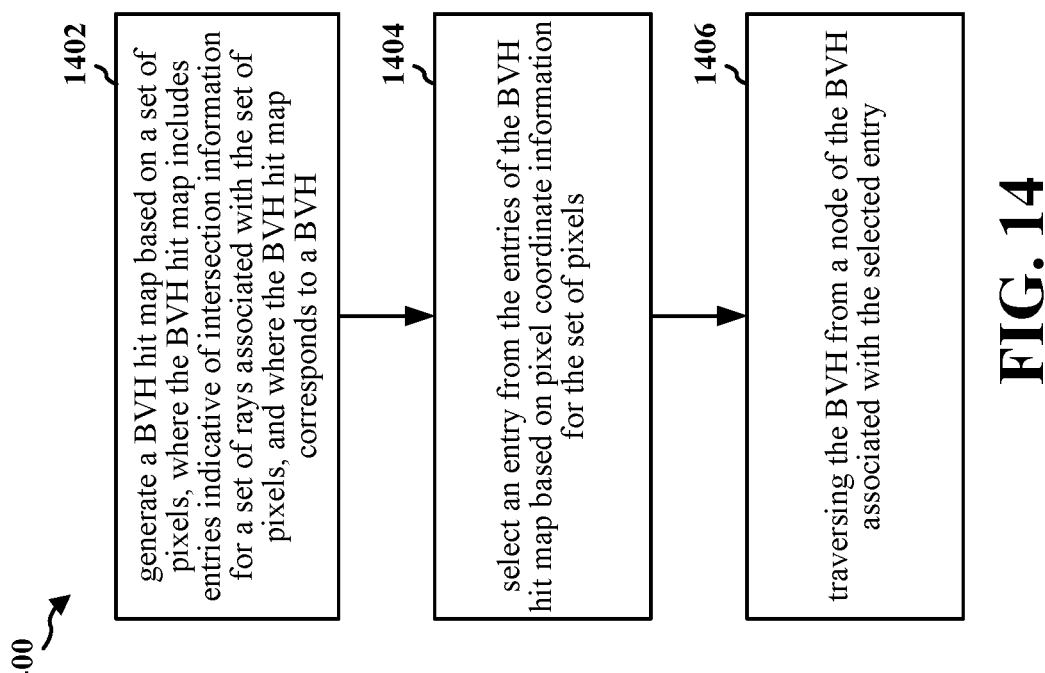

1400

1402 generate a BVH hit map based on a set of pixels, where the BVH hit map includes entries indicative of intersection information for a set of rays associated with the set of pixels, and where the BVH hit map corresponds to a BVH

1404 select an entry from the entries of the BVH hit map based on pixel coordinate information for the set of pixels

1406 traversing the BVH from a node of the BVH associated with the selected entry

FIG. 14

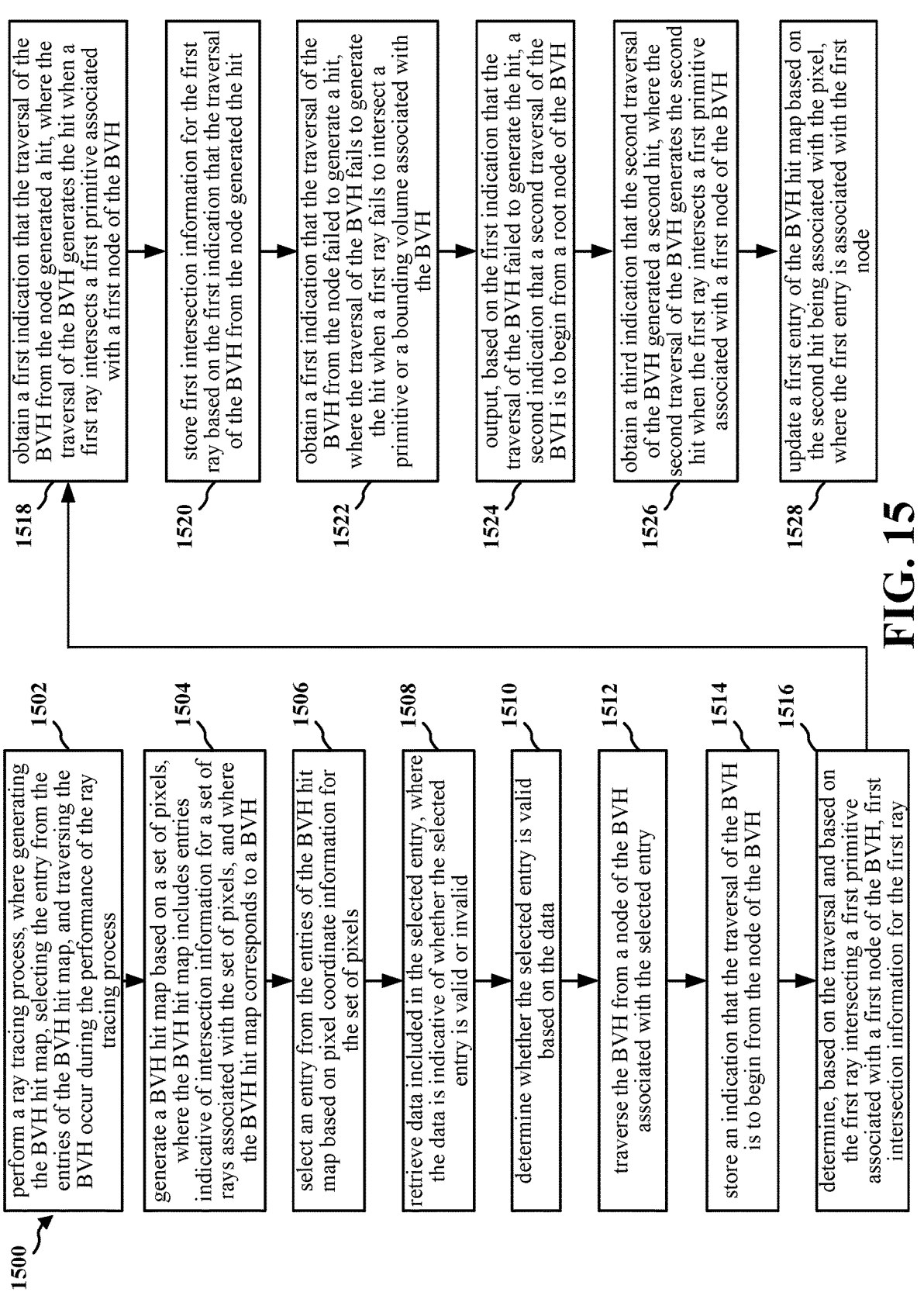

FIG. 15

1518 — obtain a first indication that the traversal of the BVH from the node generated a hit, where the traversal of the BVH generates the hit when a first ray intersects a first primitive associated with a first node of the BVH 1520 — store first intersection information for the first ray based on the first indication that the traversal of the BVH from the node generated the hit 1522 — obtain a first indication that the traversal of the BVH from the node failed to generate a hit, where the traversal of the BVH fails to generate the hit when a first ray fails to intersect a primitive or a bounding volume associated with the BVH 1524 — output, based on the first indication that the traversal of the BVH failed to generate the hit, a second indication that a second traversal of the BVH is to begin from a root node of the BVH 1526 — obtain a third indication that the second traversal of the BVH generated a second hit, where the second traversal of the BVH generates the second hit when the first ray intersects a first primitive associated with a first node of the BVH 1528 — update a first entry of the BVH hit map based on the second hit, where the first entry is associated with the first node 1502 — perform a ray tracing process, where generating the BVH hit map, selecting the entry from the entries of the BVH hit map, and traversing the BVH occur during the performance of the ray tracing process 1504 — generate a BVH hit map based on a set of pixels, where the BVH hit map includes entries indicative of intersection information for a set of rays associated with the set of pixels, and where the BVH hit map corresponds to a BVH 1506 — select an entry from the entries of the BVH hit map based on pixel coordinate information for the set of pixels 1508 — retrieve data included in the selected entry, where the data is indicative of whether the selected entry is valid or invalid 1510 — determine whether the selected entry is valid based on the data 1512 — traverse the BVH from a node of the BVH associated with the selected entry 1514 — store an indication that the traversal of the BVH is to begin from the node of the BVH 1516 — determine, based on the traversal and based on the first ray intersecting a first primitive associated with a first node of the BVH, first intersection information for the first ray

1500

SPATIAL LOCALITY FOR FIRST-HIT RAY BVH TRAVERSALS

TECHNICAL FIELD

The present disclosure relates generally to processing systems, and more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Current techniques for ray tracing may not utilize spatial locality for a set of neighboring pixels for tracing rays. There is a need for improved ray tracing techniques.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus includes a memory; and a processor coupled to the memory and, based on information stored in the memory, the processor is configured to: generate a bounding volume hierarchy (BVH) hit map based on a set of pixels, where the BVH hit map includes entries indicative of intersection information for a set of rays associated with the set of pixels, and where the BVH hit map corresponds to a BVH; select an entry from the entries of the BVH hit map based on pixel coordinate information for the set of pixels; and traverse the BVH from a node of the BVH associated with the selected entry.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 14 is a flowchart of an example method of graphics processing in accordance with one or more techniques of this disclosure.

FIG. 15 is a flowchart of an example method of graphics processing in accordance with one or more techniques of this disclosure.

DETAILED DESCRIPTION

Figure 1:
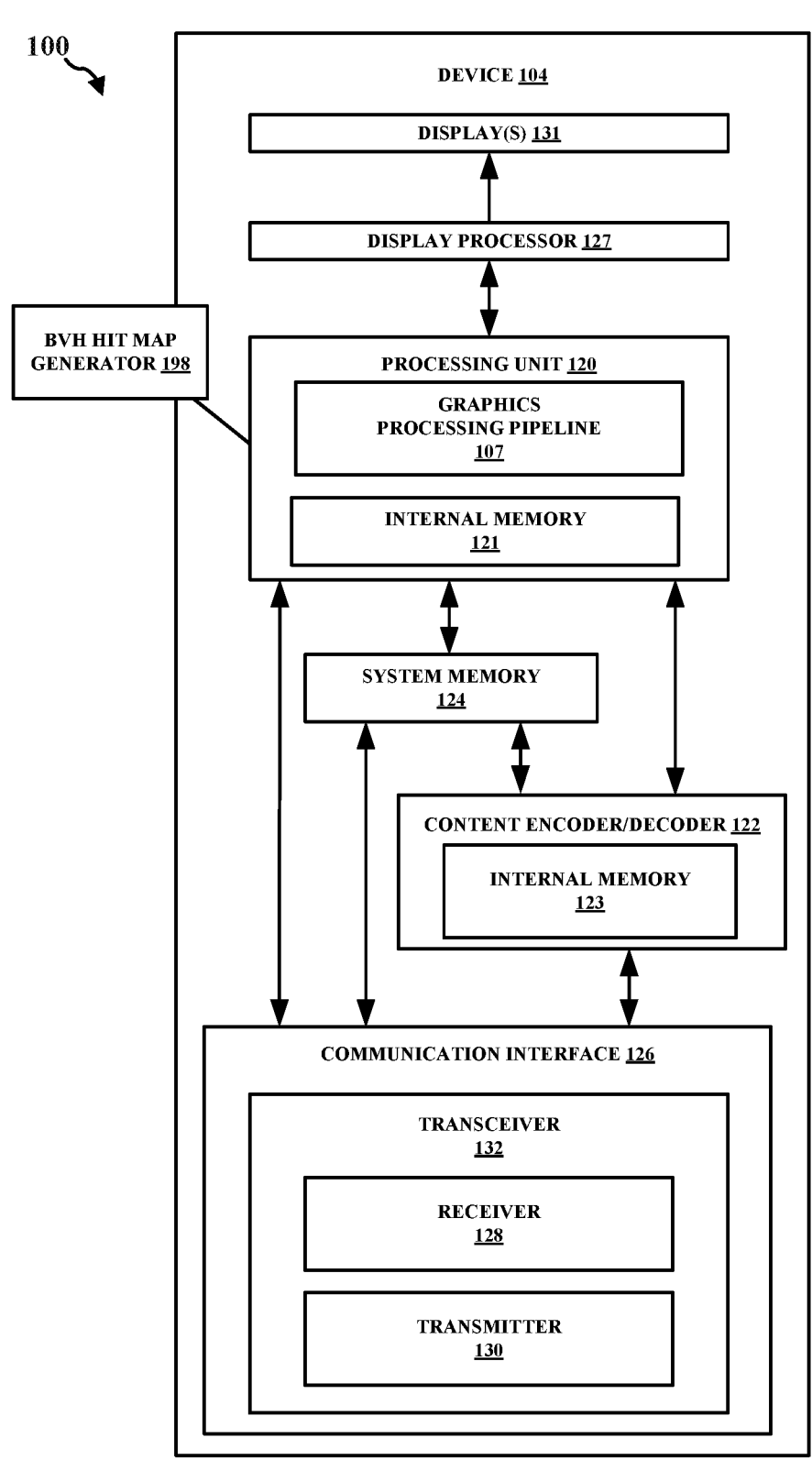
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

Ray tracing may refer to a graphical rendering technique that simulates the physical behavior of light. Ray tracing may offer increased graphical realism in comparison to other graphical rendering techniques (e.g., rasterization); however, the increased graphical realism may be associated with increased computational complexity in comparison to other graphical rendering techniques. Ray tracing may involve determining an intersection between a ray (i.e., a line having a direction that extends from a point) and a primitive (i.e., a simplest geometric shape that a system is able to draw, such as a triangle). Determining the intersection may be a computationally complex process. A graphics processor may utilize an acceleration structure in order to reduce computational complexity of ray tracing. An acceleration structure may refer to a data structure that aids a graphics processor in identifying objects in a scene that a ray is likely to intersect and objects in the scene that the ray is not likely to intersect. In an example, an acceleration structure may be a bounding volume hierarchy (BVH). A BVH may refer to a tree structure on a set of geometric objects, where the set of geometric objects form leaf nodes of the tree wrapped in bounding volumes, and where the leaf nodes are grouped as small sets and enclosed within larger bounding volumes which are in turn grouped and enclosed within other larger bounding volumes in a recursive manner, resulting in a tree structure with a single bounding volume as a root node of the tree.

Traversing an acceleration structure may time consuming and/or computationally intensive for a graphics processor. Furthermore, an application layer may be unable to exploit spatial locality of pixels during traversal of an acceleration structure, as the acceleration structures and traversals of acceleration structures may be opaque (i.e., not able to be ascertained) to the application layer. For instance, the application layer may be able to utilize the acceleration structure via an application programming interface (API) call; however, the application layer may not be able to modify traversal of an acceleration structure beyond the functionality provided by the API call.

Various technologies pertaining to exploiting spatial locality to speed up first-hit ray BVH traversals are described herein. In an example, an apparatus (e.g., a GPU) generates a bounding volume hierarchy (BVH) hit map based on a set of pixels, where the BVH hit map includes entries indicative of intersection information for a set of rays associated with the set of pixels, and where the BVH hit map corresponds to a BVH (i.e., the entries are indicative of intersection information for the BVH associated with the set of rays associated with the set of pixels). The apparatus selects an entry from the entries of the BVH hit map based on pixel coordinate information for the set of pixels. The apparatus traverses the BVH from a node (e.g., a non-root node) of the BVH associated with the selected entry. Vis-à-vis generating the BVH hit map and selecting the entry from the BVH hit map, apparatus may improve the speed of BVH traversals of first-hit rays, which may improve performance of ray tracing workloads. For instance, the node associated with the selected entry may be a non-root node of the BVH. As a result, the apparatus may traverse the BVH in a faster manner, as the traversal may involve traversing less layers than a traversal starting at a root node of the BVH. This may help to conserve computational resources and/or power resources of the apparatus. Furthermore, the apparatus may reduce a number of BVH node requests from a shader processor, which may help to reduce memory request bottlenecks (e.g., on single-hop BVH architectures).

The examples describe herein may refer to a use and functionality of a graphics processing unit (GPU). As used herein, a GPU can be any type of graphics processor, and a graphics processor can be any type of processor that is designed or configured to process graphics content. For example, a graphics processor or GPU can be a specialized electronic circuit that is designed for processing graphics content. As an additional example, a graphics processor or GPU can be a general purpose processor that is configured to process graphics content.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, a GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a BVH hit map generator 198 configured to generate a bounding volume hierarchy (BVH) hit map based on a set of pixels, where the BVH hit map includes entries indicative of intersection information for a set of rays associated with the set of pixels, and where the BVH hit map corresponds to a BVH; select an entry from the entries of the BVH hit map based on pixel coordinate information for the set of pixels; and traverse the BVH from a node of the BVH associated with the selected entry. Although the following description may be focused on graphics processing, the concepts described herein may be applicable to other similar processing techniques. Furthermore, although the following description may be focused on BVH traversal, the concepts described herein may also be applicable to other types of acceleration structures.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit or bits that indicate which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
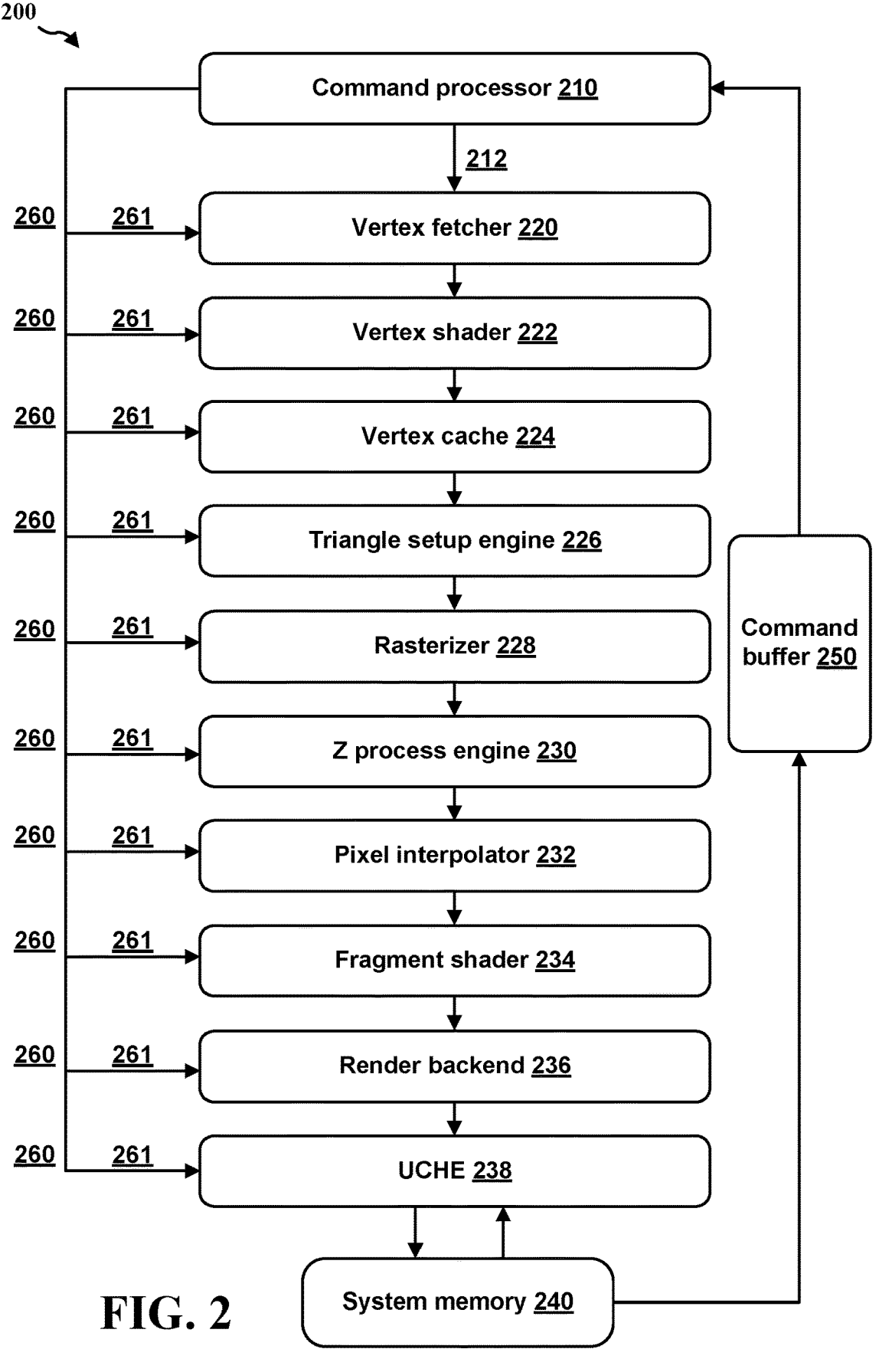
FIG. 2 illustrates an example graphics processor (e.g., a graphics processing unit (GPU)) in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call packets 212 through separate paths to the processing units or blocks in the GPU. Further, the command buffer 250 can alternate different states of context registers and draw calls. For example, a command buffer can simultaneously store the following information: context register of context N, draw call(s) of context N, context register of context N+1, and draw call(s) of context N+1.

GPUs can render images in a variety of different ways. In some instances, GPUs can render an image using direct rendering and/or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects of tiled rendering, during a binning pass, an image can be divided into different bins or tiles. In some aspects, during the binning pass, a visibility stream can be constructed where visible primitives or draw calls can be identified. A rendering pass may be performed after the binning pass. In contrast to tiled rendering, direct rendering does not divide the frame into smaller bins or tiles. Rather, in direct rendering, the entire frame is rendered at a single time (i.e., without a binning pass). Additionally, some types of GPUs can allow for both tiled rendering and direct rendering (e.g., flex rendering).

In some aspects, GPUs can apply the drawing or rendering process to different bins or tiles. For instance, a GPU can render to one bin, and perform all the draws for the primitives or pixels in the bin. During the process of rendering to a bin, the render targets can be located in GPU internal memory (GMEM). In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible so that the non-visible primitives are not rendered, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a binning, a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information can be used to determine or generate a visibility stream. In a rendering pass, the primitives in each bin can be rendered separately. In these instances, the visibility stream can be fetched from memory and used to remove primitives which are not visible for that bin. Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
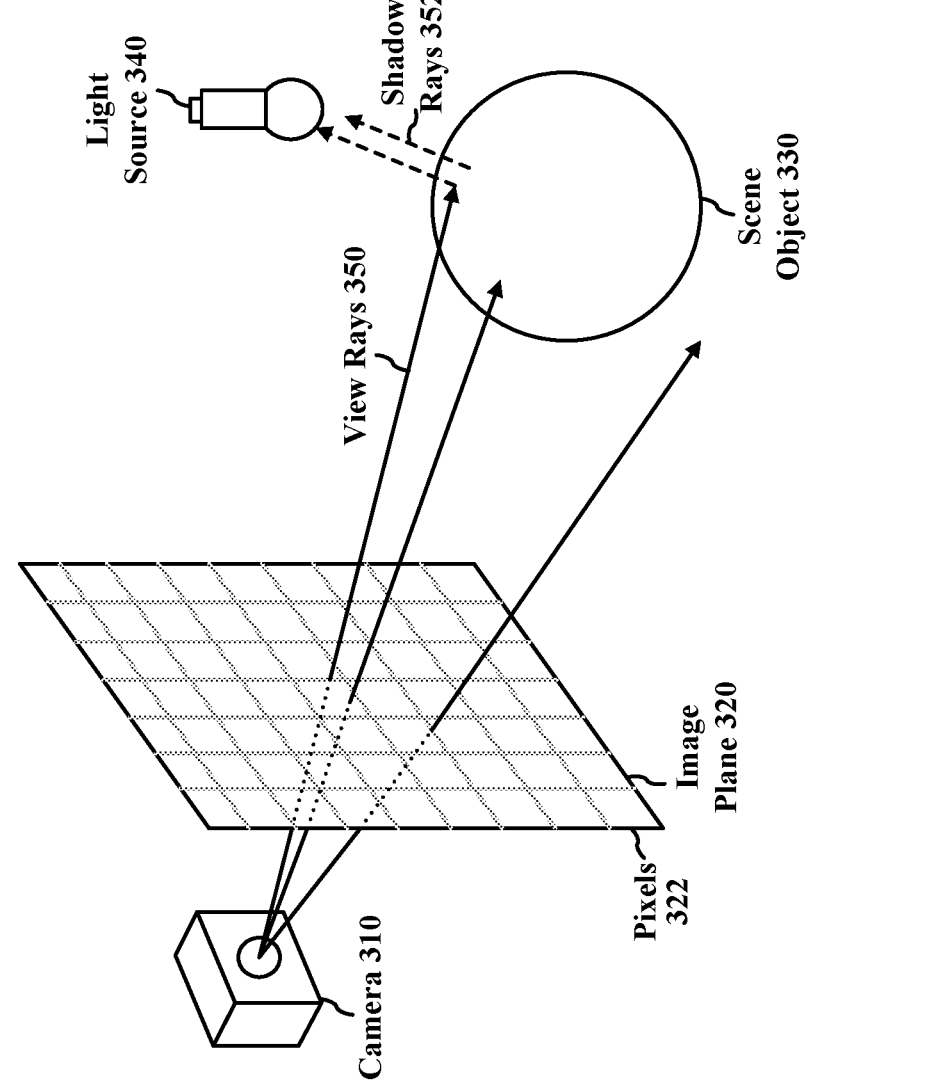
FIG. 3 is a diagram illustrating an example ray tracing process in accordance with one or more techniques of this disclosure.

FIG. 3 illustrates diagram 300 including one example of a ray tracing process. As shown in FIG. 3, diagram 300 includes camera 310, image plane 320 including pixels 322, scene object 330, light source 340, view rays 350, and shadow rays 352. FIG. 3 shows that view rays 350 are traced from camera 310 and through image plane 320. After passing image plane 320, the view rays 350 are traced to scene object 330. At least some of the view rays 350 are traced off of scene object 330 and are traced towards light source 340 as shadow rays 352. Accordingly, the shadow rays 352 and view rays 350 may trace the light from light source 340. FIG. 3 depicts how ray tracing may generate an image by tracing the path of light (e.g., from light source 340) for the pixels in an image plane (e.g., pixels 322 in image plane 320).

Ray tracing is distinguishable from a number of other rendering techniques utilized in graphics processing, such as rasterization. In the process of rasterization, for each pixel in each primitive in a scene, the pixel may be shaded if a portion of the pixel is covered by the primitive. In contrast, in the process of ray tracing, for each pixel corresponding to a primitive in a scene, a ray is generated. If the generated ray is determined to hit or strike a certain primitive, then the pixel is shaded. In some instances of graphics processing, ray tracing algorithms may be performed alongside raster-ization, such as via a hybrid ray tracing/rasterization model.

Figure 4A:
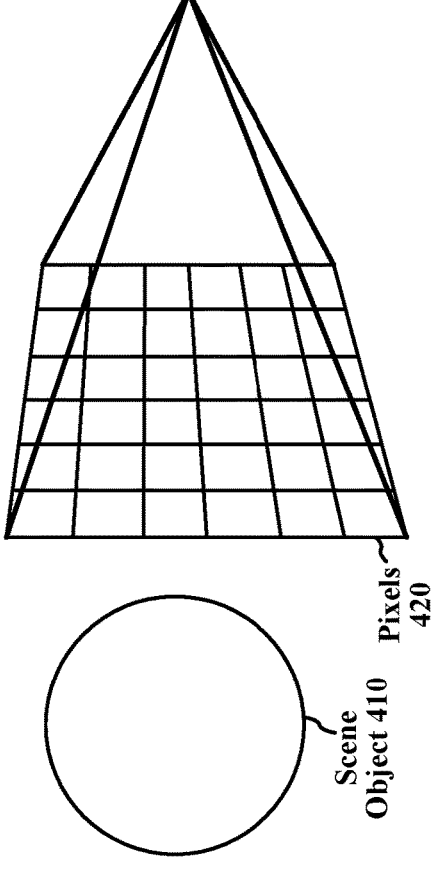
FIG. 4A is a diagram illustrating an example rasterization process in accordance with one or more techniques of this disclosure.
Figure 4B:
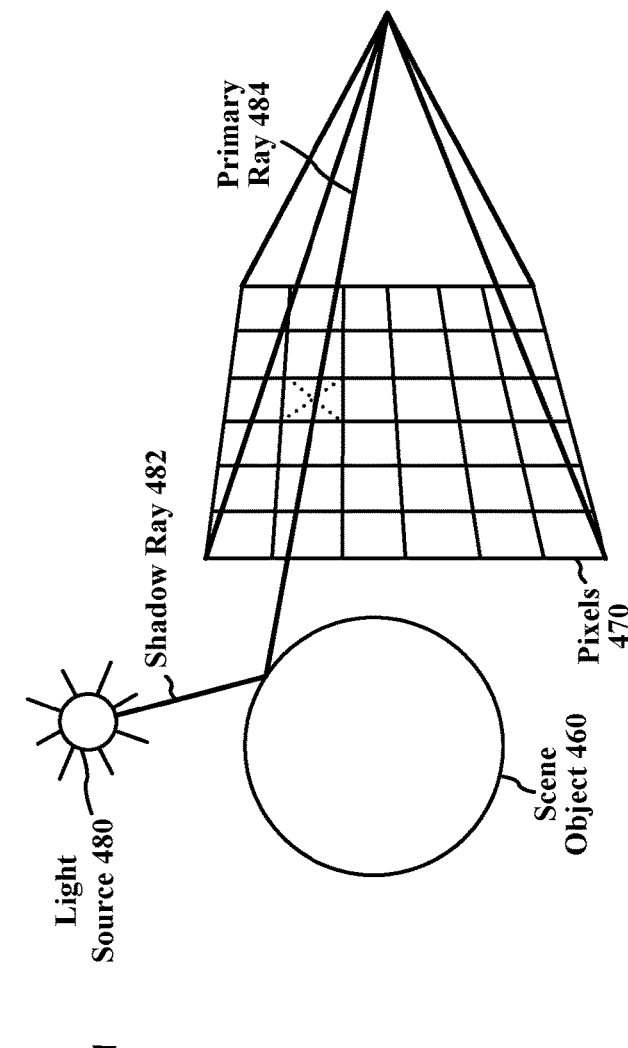
FIG. 4B is a diagram illustrating an example ray tracing process in accordance with one or more techniques of this disclosure.

FIGS. 4A and 4B illustrate diagram 400 and diagram 450 including an example process of rasterization and an example process of ray tracing, respectively. As shown in FIG. 4A, diagram 400 includes scene object 410 and pixels 420. FIG. 4A depicts that the process of rasterization deter-mines, for each of pixels 420 in a scene including scene object 410, a pixel is shaded if a portion of the pixel is covered by a primitive. As shown in FIG. 4B, diagram 450 includes scene object 460, pixels 470, light source 480, shadow ray 482, and primary ray 484. FIG. 4B depicts that the process of ray tracing determines if a generated ray (e.g., shadow ray 482) will hit or strike a certain primitive in scene object 460 corresponding to one of the pixels 470 via primary ray 484, then the pixel is shaded.

As indicated herein, the process of ray tracing may be performed by determining whether a ray will hit/strike any primitive(s) in a scene. For example, ray tracing algorithms may perform a simple query operation: Is a given ray going to hit/strike any primitive(s) in a scene? The process of ray tracing is computationally intensive, as a large amount of rays may be traced against a large number of primitives/triangles, which may utilize a large number of ray-triangle intersection tests. For example, in one ray tracing procedure, approximately 1 million rays may be traced against approxi-mately 1 million primitives/triangles, which may utilize approximately 1 trillion ray-triangle intersection tests. In some aspects of ray tracing procedures, an origin point for a given ray may be represented by O(N). Further, there may be a number of values calculated for the ray, such as a minimum time to strike primitives in a scene ($t_{min}$), a maximum time to strike primitives in a scene ($t_{max}$), and a calculated distance to strike primitives in the scene.

Figure 5:
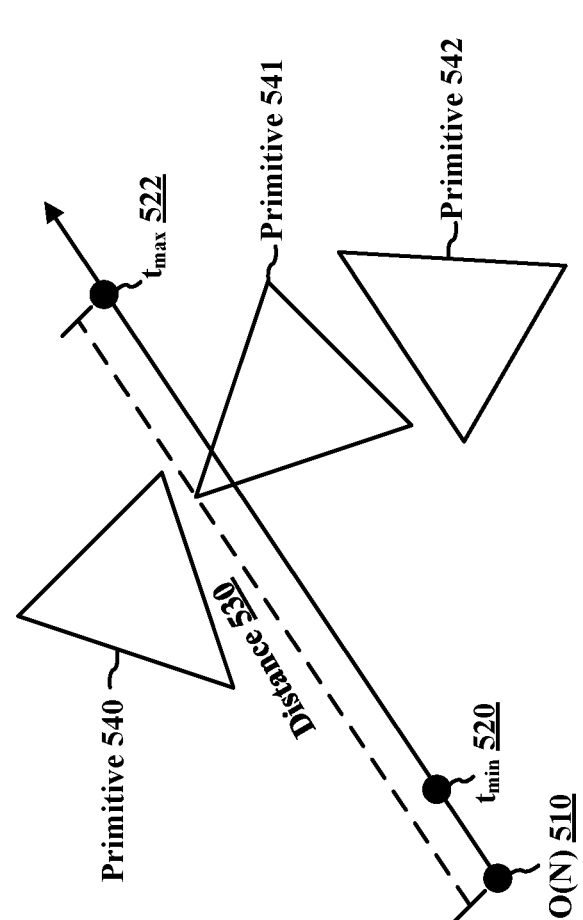
FIG. 5 is a diagram illustrating an example ray tracing process in accordance with one or more techniques of this disclosure.
Figure 5:

FIG. 5 illustrates diagram 500 including one example of a ray tracing process. As shown in FIG. 5, diagram 500 includes origin point for a ray (O (N) 510), a minimum time to strike primitives in a scene ($t_{min}$ 520), a maximum time to strike primitives in a scene ($t_{max}$ 522), a calculated distance to strike primitives in the scene (distance 530), and a number of primitives (primitive 540, primitive 541, and primitive 542) in the scene. FIG. 5 shows that ray tracing techniques may utilize a number of values to determine if a ray is going to hit a primitive. For instance, to determine if a ray will strike a primitive, ray tracing techniques may utilize an origin point for a ray (O (N) 510), a minimum time to strike primitives ($t_{min}$ 520), a maximum time to strike primitives ($t_{max}$ 522), a calculated distance to strike primitives (distance 530), and a number of primitives (primitive 540, primitive 541, and primitive 542).

Ray tracing may utilize various data structures for accel-erating a computational process, such as a bounding volume hierarchy (BVH). In a bounding volume hierarchy, primi-tives are held in leaf nodes. Further, internal nodes may hold access aligned bounding boxes (AABBs) that enclose cer-tain leaf node geometry. Data structures for ray tracing may also utilize a ray-box intersection for internal nodes and/or a ray-triangle test for leaf nodes. These types of data structures may reduce the computational complexity (N) of the ray tracing process, e.g., reduce the computational complexity (N) by log (N).

Figure 6B:
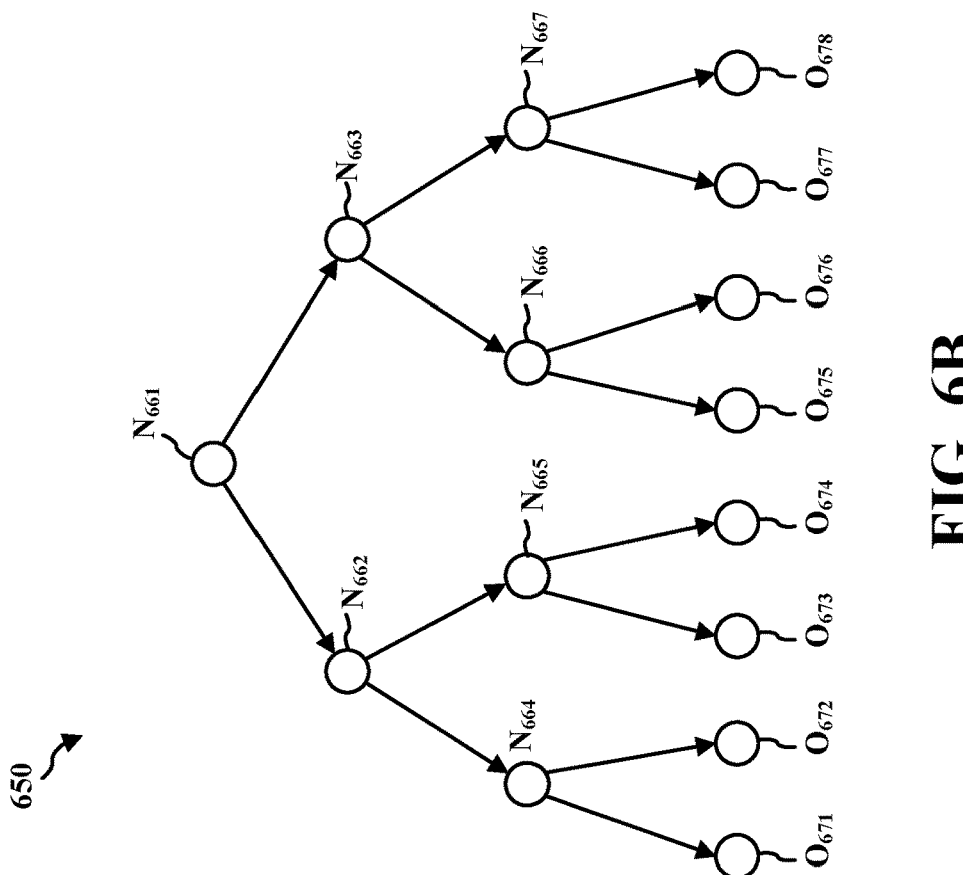
FIG. 6B is a diagram illustrating an example data structure in accordance with one or more techniques of this disclosure.
Figure 6A:
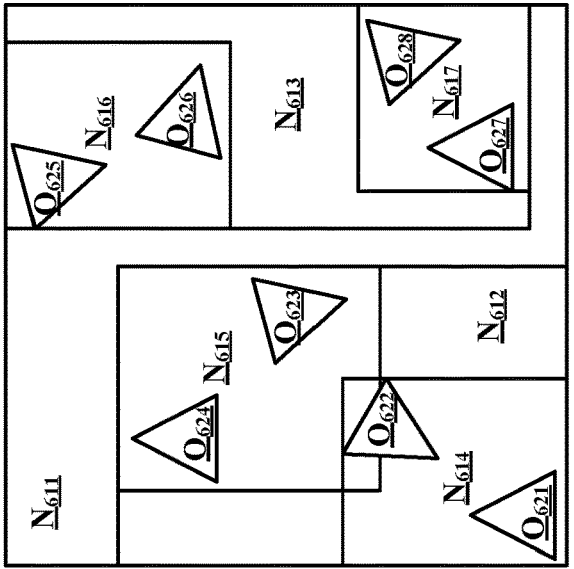
FIG. 6A is a diagram illustrating an example data structure in accordance with one or more techniques of this disclosure.

FIGS. 6A and 6B illustrate diagram 600 and diagram 650, respectively, including example data structure techniques utilized in ray tracing. As shown in FIG. 6A, diagram 600 includes a number of nodes (internal nodes $N_{611}$-$N_{617}$) and a number of primitives (primitives $O_{621}$-$O_{628}$). FIG. 6A depicts a ray-box intersection for internal nodes $N_{611}$-$N_{617}$ and primitives $O_{621}$-$O_{628}$. As shown in FIG. 6B, diagram 650 includes a number of nodes (leaf nodes $N_{661}$-$N_{667}$) and a number of primitives (primitives $O_{671}$-$O_{678}$). FIG. 6B depicts a ray-triangle test for leaf nodes $N_{661}$-$N_{667}$ and primitives $O_{671}$-$O_{678}$. Both of the data structure techniques in FIGS. 6A and 6B, e.g., the ray-box intersection and the ray-triangle test, aim to reduce the computational complex-ity in ray tracing.

As indicated herein, there are a number of different stages during a ray tracing process. For example, the stages of ray tracing may include: bounding volume hierarchy construc-tion and refinement, ray generation, bounding volume hier-archy traversal, ray-triangle intersection, and ray-box inter-section. There may also be different steps during bounding volume hierarchy construction, including partitioning tri-angles into multiple groups, forming a bounding box around each group, and recursively partitioning each group. Addi-tionally, there may be several ways to partition during bounding volume hierarchy construction, which may result in a certain number of possible solutions, e.g., $2^{n \ log \ n}$ solutions. As a result, these improved solutions may yield improved ray tracing performance.

Aspects of ray tracing may also utilize a number of bounding volume hierarchy algorithms, such as split bound-ing volume hierarchy (SBVH) and linear bounding volume hierarchy (LBVH). In some instances, SBVH may result in slower build times and better quality compared to LBVH. Likewise, LBVH may result in faster build times and poorer quality compared to SBVH. Additionally, some aspects of ray tracing may utilize bounding volume hierarchy refine-ment. In bounding volume hierarchy refinement, given a binary BVH with one triangle per leaf, ray tracing tech-niques may permute the tree topology. Bounding volume hierarchy refinement may utilize different algorithms, e.g., a treelet restructuring BVH (TRBVH) and a parallel reinser-tion BVH (PRBVH). Some aspects of ray tracing may also utilize BVH widening, which may convert a binary tree (i.e., an initial BVH) to a wide BVH that is wider than the binary tree or initial BVH. For example, hierarchy in the initial BVH may include three levels, where the primitives are included in a third level of the hierarchy. The hierarchy in the wide BVH may include two levels, where the primitives are included in a second level of the hierarchy. In some instances of BVH widening, the wide BVH may include an internal node with a certain amount of AABBs (e.g., up to eight AABBs) and a leaf node with a certain amount of primitives/triangles (e.g., up to four primitives/triangles).

Figure 7B:
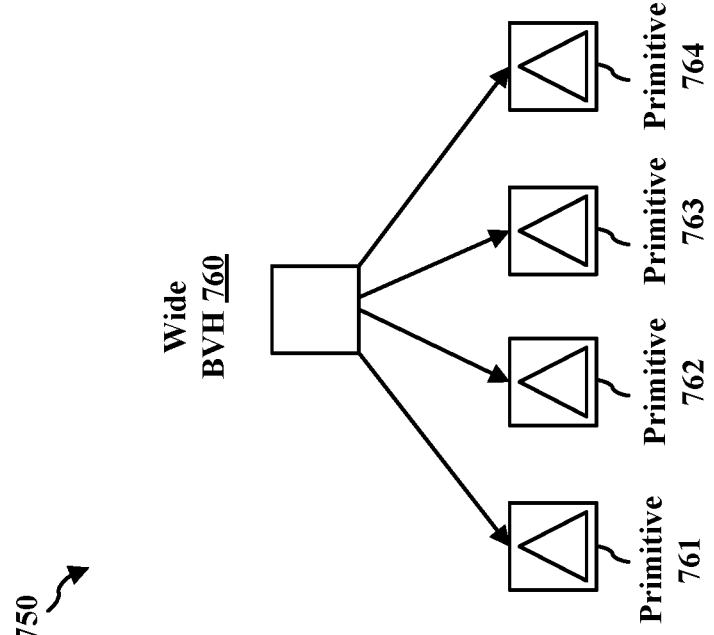
FIG. 7B is a diagram illustrating another example BVH in accordance with one or more techniques of this disclosure.
Figure 7A:
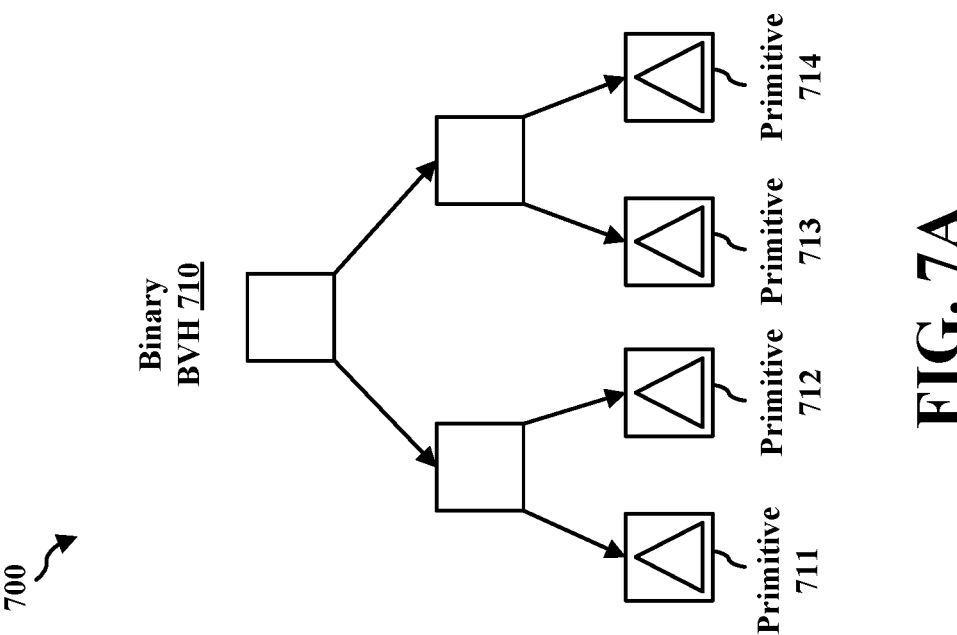
FIG. 7A is a diagram illustrating an example bounding volume hierarchy (BVH) in accordance with one or more techniques of this disclosure.

FIGS. 7A and 7B illustrate diagram 700 and diagram 750 including a binary bounding volume hierarchy and a wide bounding volume hierarchy, respectively. As shown in FIG. 7A, diagram 700 includes a binary bounding volume hierarchy 710 including primitive 711, primitive 712, primitive 713, and primitive 714. FIG. 7A depicts that binary bounding volume hierarchy 710 includes three levels, where primitives 711-714 are in the third level of the hierarchy. As shown in FIG. 7B, diagram 750 includes a wide bounding volume hierarchy 760 including primitive 761, primitive 762, primitive 763, and primitive 764. FIG. 7B depicts that wide bounding volume hierarchy 760 includes two levels, where primitives 761-764 are in the second level of the hierarchy. As shown in FIGS. 7A and 7B, binary bounding volume hierarchy 710 may undergo a process of bounding volume hierarchy widening that results in wide bounding volume hierarchy 760.

Some aspects of ray tracing may utilize bounding volume hierarchy compression. For instance, ray tracing techniques may compress wide nodes to fit a fixed size (e.g., 64 bytes). The BVH compression may include an internal node compression that compresses an amount of AABBs (e.g., eight AABBs) and/or a first child index. The BVH compression may also include a leaf node compression that compresses a certain amount of primitives/triangles (e.g., up to four primitives/triangles) and the corresponding indices. Also, ray tracing techniques may utilize bounding volume hierarchy traversal, such as breadth first search traversal and/or depth first search traversal of a wide BVH. Some aspects of ray tracing generation may utilize an operation where rays are generated on-the-fly. For instance, a number a different types of rays may be generated such as primary rays, shadow rays, and/or secondary rays.

Additionally, there may be a number of different ray tracing stages utilized in hardware or software, e.g., GPU/CPU hardware or software. For instance, in certain stages, a driver may construct the BVH on a CPU or GPU (e.g., a BVH construction stage and a BVH node compression stage). In a BVH traversal stage, the BVH traversal may occur in the shader at the GPU. Also, certain stages may be implemented in the GPU hardware (e.g., a BVH node decompression stage, a ray-bounding box intersection stage, and a ray-triangle intersection stage).

Aspects of graphics processing may store ray tracing data in different types of memory, e.g., a system memory. However, one potential issue for ray tracing performance is the amount of memory bandwidth available, as accessing data from memory (e.g., the system memory) may take a large amount of access cycles. In some instances, geometry data may be stored in an acceleration structure (e.g., a bounding volume hierarchy (BVH) structure). An acceleration structure or BVH structure is a tree structure including multiple nodes (e.g., a binary tree structure or a n-ary tree structure), where primitive data is stored in leaf nodes (i.e., the nodes in the branches of the tree structure). For each ray in a ray tracing process, the GPU may need to traverse from the root node (i.e., the top node in the tree structure) to the leaf nodes. The BVH structure may be associated with graphics processing scenes that include a number of primitives. Also, each of these primitives may correspond to one of the nodes in the BVH structure. For example, for some scenes, a BVH structure associated with the scene may hold a large number of primitives (e.g., millions of primitives).

Bounding volume hierarchies and similar data structures are an efficient manner in which to store the geometry data for accelerating ray tracing performance. Although binary BVHs with a single primitive in a leaf node and one bounding box in an internal node may be helpful to improve ray tracing performance, increasing the width of BVHs to certain levels may improve the performance of ray tracing at a GPU. For example, increasing the width of BVHs to certain levels (e.g., an 8-wide BVH with up to 8 child nodes and up to 4 primitives in leaf nodes) based on surface area heuristics (SAH) may improve the performance of ray tracing at a GPU.

In some aspects, rather than building all the geometry to a single BVH, some types of application program interfaces (APIs) may split the geometry to multiple bottom-level BVHs (i.e., one or more sections of a BVH that are below another section of the BVH) which contain the primitive geometry (e.g., triangles or bounding boxes) and a top-level BVH (i.e., one or more sections of a BVH that are above another section of the BVH). In some instances, a top-level BVH may be formed with the bottom-level BVH references. Also, splitting the geometry between bottom-level BVHs and creating a top level BVH may increase the flexibility and reusability of the geometry, as well as increase the surface area heuristic (SAH) of the overall structure. In some aspects, a bottom-level BVH may store multiple primitives in its leaf node, whereas a top-level BVH may store just one bottom-level BVH in its leaf node. For instance, a top-level BVH may store one bottom-level BVH in its leaf node due to the additional information that is needed, so multiple bottom-level BVHs may not be able to be stored in a top-level BVH leaf node. Also, in the case where geometry is not split properly across the bottom-level BVH, the SAH and ray tracing performance may be degraded. For example, geometry from different parts of a scene may be added to a BVH and not split properly across the bottom-level BVH, such that the SAH and ray tracing performance may be degraded.

Figure 8:
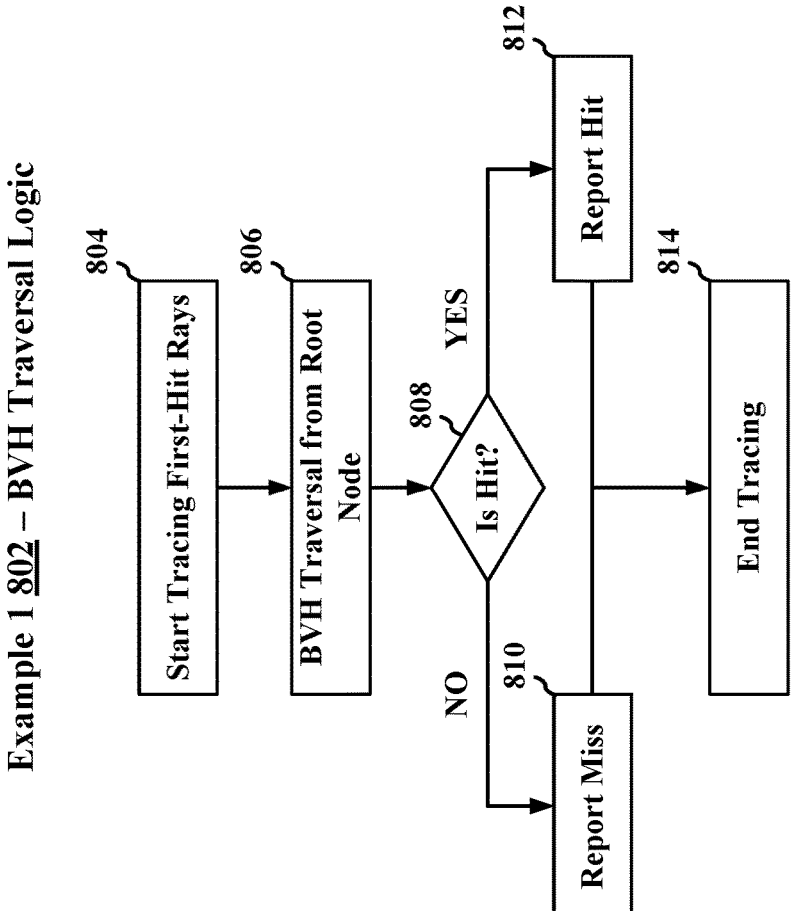
FIG. 8 is a diagram illustrating a first example of BVH traversal logic in accordance with one or more techniques of this disclosure.
Figure 8:
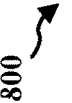

FIG. 8 is a diagram 800 illustrating a first example 802 of BVH traversal logic in accordance with one or more techniques of this disclosure. The BVH traversal logic may be implemented in hardware and/or software. At 804, an apparatus (e.g., a GPU, a ray tracing unit (RTU) of a GPU, etc.) may start tracing first-hit rays. Tracing first-hit rays may refer to determining the first of any primitive from a set of primitives that a ray intersects in a scene. The first primitive that the ray intersects may or may not be the closest primitive to a camera (i.e., an observer). Tracing first-hit rays may be utilized to render shadows in a scene. In contrast, tracing closest-hit rays may refer to determining the closest primitive from a camera that a ray intersects.

At 806, the apparatus may begin a BVH traversal from a root node of the BVH. In an example, the BVH may be the binary bounding volume hierarchy 710 or the wide bounding volume hierarchy 760. The root node (i.e., a top-level node) of the BVH may be a node in the BVH that has no incoming edges. The root node may correspond to a volume that encompasses all objects (e.g., all primitives) in a scene. The traversal of the BVH may proceed from the root node to internal node(s) (which may also be referred to as intermediate nodes) of the BVH. An internal node may correspond to a volume that encompasses a portion (i.e., less than all) of the objects (e.g., primitives) in the scene. The traversal of the BVH may proceed from the internal node(s) to a leaf node of the BVH. A leaf node may correspond to a volume that encompasses a single object (e.g., a single primitive) in the scene. When traversing the BVH from a first node to a second node in the BVH for a given ray, the apparatus may determine whether the given ray intersects a volume corresponding to the second node. For instance, the apparatus may perform a ray-box intersection test on the volume (or a ray-triangle intersection test if the second node is a leaf node). If the given ray does not intersect the volume corresponding to the second node, the apparatus may cease traversal of the BVH. This may be referred to as a "miss," as the given ray "misses" intersecting the volume corresponding to the second node. If the given ray intersects the volume corresponding to the second node, the apparatus may take one of two actions. First, if the second node is an intermediate node, the apparatus may continue traversal of the BVH from the second node using a process similar to that described above, where the second node may be considered as the first node as described above and where a third node (connected to the second node) may be considered as the second node as described above. Second, if the second node is a leaf node and if the given ray intersects a volume associated with the leaf node, the apparatus may determine intersection information (i.e., coordinates of the intersection of the ray with the object (e.g., the primitive)). This may be referred to as a "hit," as the given ray hits the object (e.g., the primitive).

At 808, the apparatus may determine whether traversal of the BVH for the ray produced a hit. At 810, upon negative determination, the apparatus may report a miss. At 812, upon positive determination, the apparatus may report a hit. The apparatus may end tracing at 814. The report of the hit or the miss for the ray may be used for pixel shading purposes. For instance, if a hit is reported (i.e., if the ray intersects a primitive), the apparatus may shade a pixel based on intersection information associated with the hit. The apparatus may output the shaded pixel for display on a display panel (e.g., the display(s) 131).

Acceleration structure traversal may represent a significant percentage of ray tracing work. Traversal of first-hit rays (which may be commonly used for shadows) may have a high degree of spatial locality for a set of neighboring pixels. If spatial locality can be exploited to speed up acceleration structure traversals, then ray tracing performance may be improved. However, an application layer may not be able to exploit this spatial locality since acceleration structures and their traversals may be an opaque process. To address this, an apparatus may generate a map of the last known intersection information for a group of neighboring pixels (based on a provoking pixel in that group) and the apparatus may use this information to speed up traversals of first-hit rays. The map may be generated on either GPU hardware or GPU software. The map may store information for fetching the bounding volume hierarchy (BVH) node of the last known intersection. The BVH hit map may be generated in-place during BVH traversal by choosing a provoking pixel from a set of N×M pixel blocks and by storing the BVH hit node information and valid bits to a piece of memory provided by a driver or to extra ray tracing unit (RTU) memory in hardware. Before BVH traversal starts, an entry in the BVH hit map for the N×M pixel blocks may be fetched, and if valid, node information from the entry may be given to RTU hardware as a starting point to search the BVH. If no intersection is found, then the RTU hardware may traverse the BVH from the root node. This may effectively exploit spatial locality of neighboring pixels to speed up traversal of a BVH since there may be a high probability of hitting the same geometries.

Figure 9:
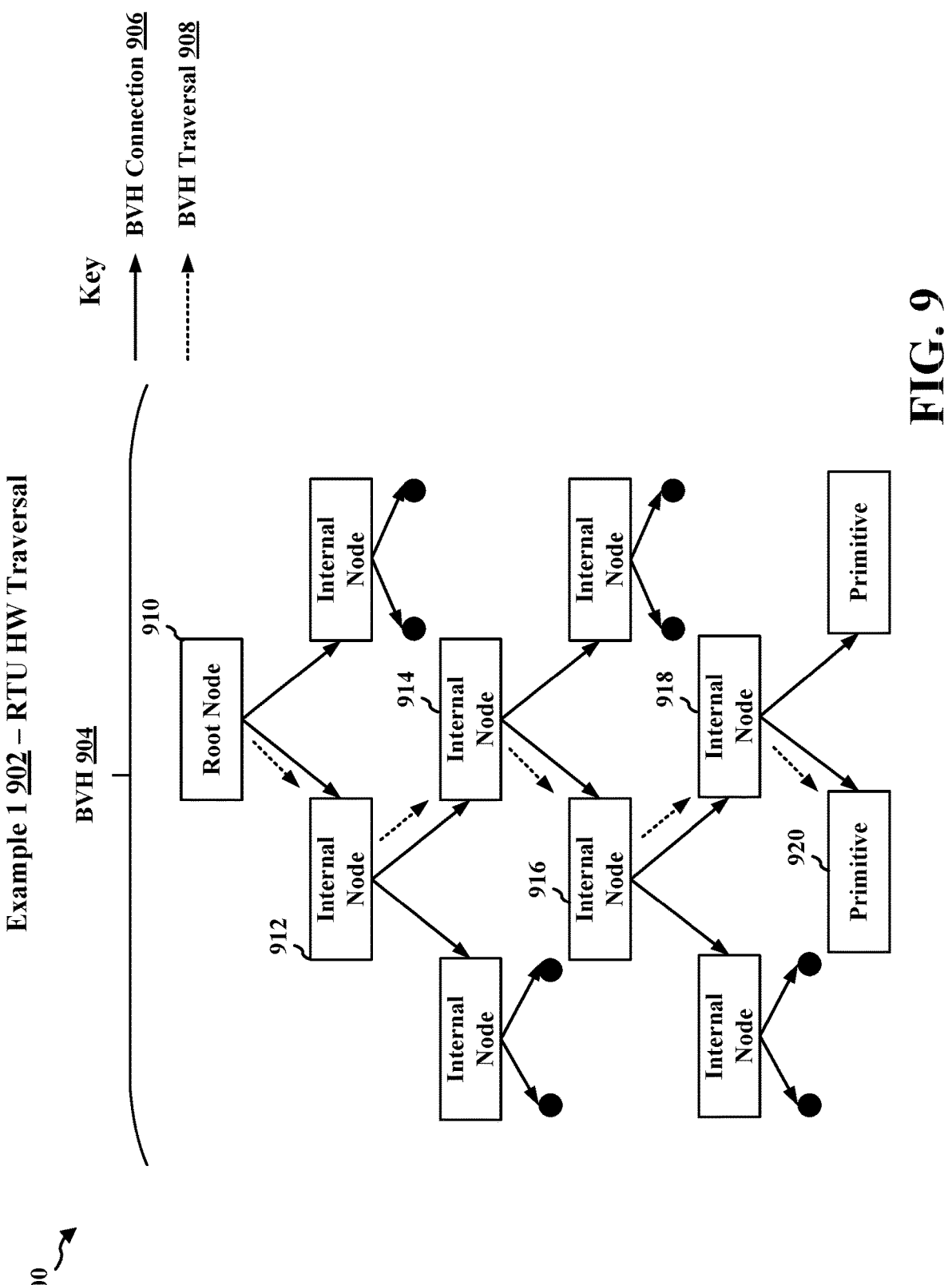
FIG. 9 is a diagram illustrating a first example of a traversal of a BVH by ray tracing unit (RTU) hardware in accordance with one or more techniques of this disclosure.

FIG. 9 is a diagram 900 illustrating a first example 902 of a traversal of a BVH 904 by ray tracing unit (RTU) hardware in accordance with one or more techniques of this disclosure. The traversal of the BVH 904 in the first example 902 may correspond to the first example 802 of BVH traversal logic described above in the description of FIG. 8. An apparatus (e.g., an RTU of a GPU) may generate the BVH 904 as part of a ray tracing process. In an example, the BVH 904 may be or include the binary bounding volume hierarchy 710 or the wide bounding volume hierarchy 760. In the diagram 900, a BVH connection 906 is indicated by a solid line with an arrow and a BVH traversal 908 is indicated by a dotted line. In an example, the BVH 904 may include a root node 910, an internal node 912, an internal node 914, an internal node 916, an internal node 918, a leaf node 920 (labelled in FIG. 9 as "Primitive"), additional internal nodes, and additional leaf nodes. In FIG. 9, darkened circles may represent an internal node or a leaf node.

An apparatus (e.g., an RTU of a GPU) may begin traversal of the BVH 904 from the root node 910. The apparatus may determine that a ray intersects a volume associated with internal node 912 (e.g., via a ray-box intersection test). The apparatus may traverse the BVH 904 from the root node 910 to internal node 912. The apparatus may determine that the ray intersects a volume associated with internal node 914. The apparatus may traverse the BVH 904 from internal node 912 to internal node 914. The apparatus may determine that the ray intersects a volume associated with internal node 916. The apparatus may traverse the BVH 904 from internal node 914 to internal node 916. The apparatus may determine that the ray intersects a volume associated with internal node 918. The apparatus may traverse the BVH 904 from internal node 916 to internal node 918. The apparatus may determine that the ray intersects a volume associated with the leaf node 920 (e.g., via a ray-triangle intersection test). When the ray intersects the volume associated with the leaf node 920, the apparatus may report a hit (e.g., corresponding to 812 in FIG. 8).

As noted above, the apparatus may begin traversal of the BVH 904 from the root node 910. The traversal may continue until (1) the apparatus determines that the ray does not intersect a volume associated with any child nodes of a node of the BVH 904 (i.e., "report miss") or (2) the apparatus determines that the ray intersects a volume corresponding to a leaf node, where the leaf node corresponds to a primitive in a scene (i.e., "report hit"). Traversing the BVH in such a manner may be associated with increased traversal times and/or increased usage of computational resources of the apparatus, particularly when the BVH 904 includes a large number of levels (i.e., layers).

Figure 10:
FIG. 10 is a diagram illustrating an example of a BVH hit map in accordance with one or more techniques of this disclosure.

FIG. 10 is a diagram 1000 illustrating an example of a BVH hit map 1002 in accordance with one or more techniques of this disclosure. As will be described in greater detail below, GPU hardware and/or GPU software may generate the BVH hit map 1002 as part of a ray tracing process. Furthermore, the BVH hit map 1002 may be utilized to increase a speed of tracing of rays (e.g., first-hit rays). The BVH hit map 1002 may be stored in a piece of memory provided by a driver or the BVH hit map 1002 may be stored in RTU memory of a GPU.

The BVH hit map 1002 may include BVH hit map entries 1004, where each of the BVH hit map entries 1004 may correspond to a pixel block (e.g., 4×4 pixels, 8×8 pixels, etc.). In an example, a BVH hit map entry 1006 in the BVH hit map entries 1004 may include a validity indication 1008 and a BVH node identifier 1010. The validity indication 1008 may indicate whether the BVH hit map entry 1006 is valid. In an example, as part of an initialization process for the BVH hit map 1002 prior to a start of a ray tracing process, the GPU hardware and/or the GPU software may initialize the validity indications (including the validity indication 1008) for each of the BVH hit map entries 1004 to indicate that such entries are invalid. In an example, and as will be described in greater detail below, the GPU hardware and/or the GPU software may change the validity indication 1008 to indicate that the BVH hit map entry 1006 is valid based on (1) a BVH traversal from a root node of a BVH producing a hit and (2) a pixel associated with the hit being a provoking pixel. In another example, the validity indication 1008 may be changed to valid from invalid or from invalid to valid based on an indication from a driver and/or based on an indication from graphics processing hardware. The BVH node identifier 1010 may include an identifier for a node in a BVH (e.g., the binary bounding volume hierarchy 710 or the wide bounding volume hierarchy 760), where the node may correspond to a last known intersection of a ray. In one aspect, the BVH hit map 1002 may be invalidated on the start of each ray tracing process. In another aspect, the BVH hit map 1002 may be invalidated after every P starts of a ray tracing process, where P is a positive integer.

The BVH hit map entry 1006 may be associated with a pixel block 1012. In an example, the pixel block 1012 may be of size N×N, where N is a positive integer. In an example, N may be four, eight, ten, etc. In the example depicted in FIG. 10, N is 4, and as a result, the pixel block 1012 is a 4×4 pixel block that includes sixteen total pixels. In another example, the pixel block may be of size N×M, where N is a first positive integer and M is a second positive integer. In an example, N may be four, eight, ten, etc. and M may be two, three, four, five, ten, etc. The pixel block 1012 may be referred to as a group of neighboring pixels. Neighboring pixels may refer to pixels that are adjacent from one another or within a threshold distance of one another. The GPU hardware and/or the GPU software may designate one (or more than one) of the pixels in the pixel block 1012 as a provoking pixel 1014. In one example, the GPU hardware and/or the GPU software may designate a pixel as the provoking pixel 1014 based on defined criteria (e.g., a top-left pixel in the pixel block 1012). In another example, the GPU hardware and/or the GPU software may designate the pixel as the provoking pixel 1014 based on a randomly generated number.

Figure 11:
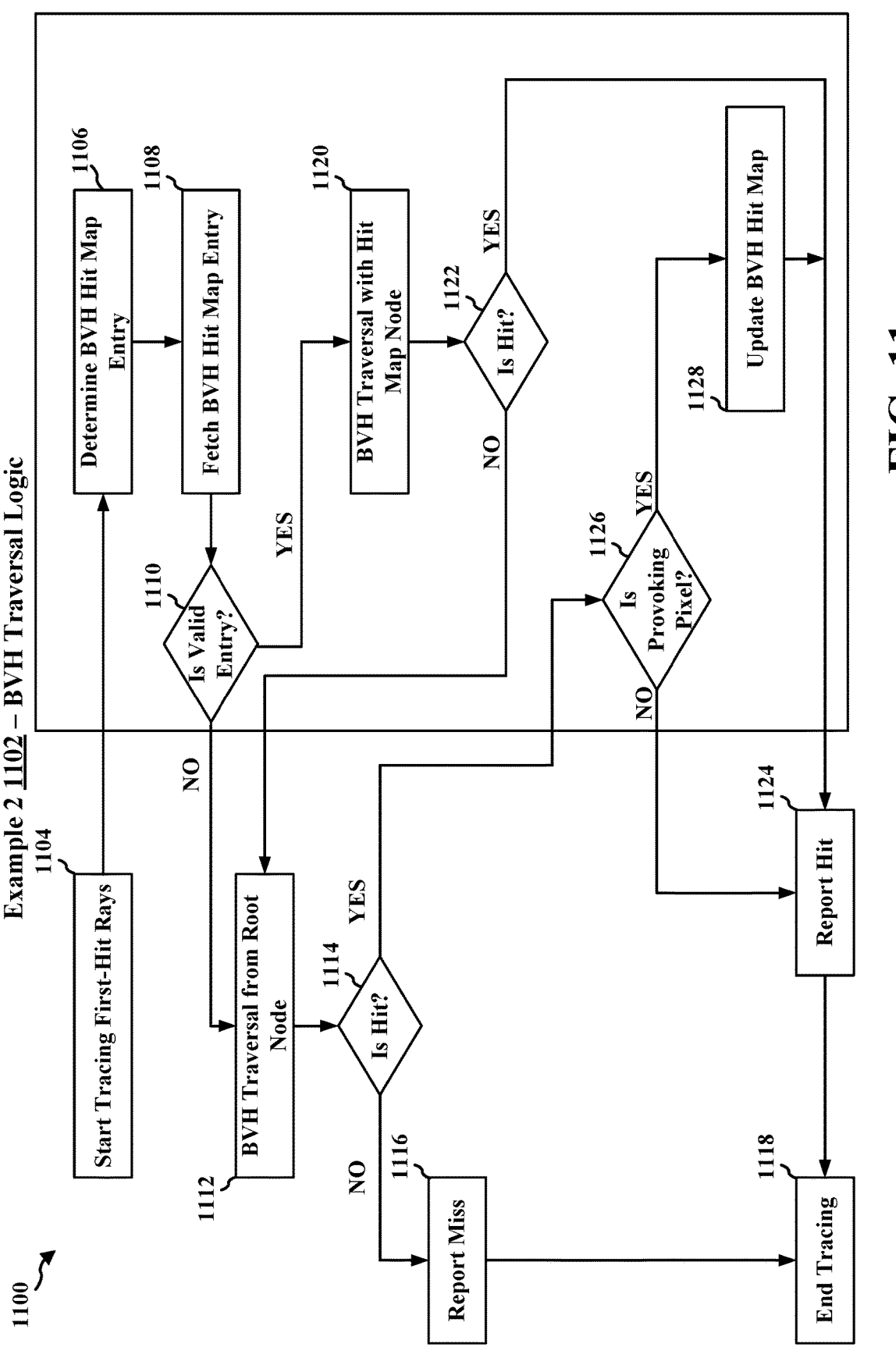
FIG. 11 is a diagram illustrating a second example of BVH traversal logic in accordance with one or more techniques of this disclosure.

FIG. 11 is a diagram 1100 illustrating a second example 1102 of BVH traversal logic in accordance with one or more techniques of this disclosure. The BVH traversal logic may be implemented in hardware and/or software. At 1104, an apparatus (e.g., a GPU, a ray tracing unit (RTU) of a GPU (which may also be referred to as ray tracing hardware), etc.) may start tracing first-hit rays. At 1106, the apparatus may determine (i.e., identify) a BVH hit map entry (e.g., the BVH hit map entry 1006) of a BVH hit map (e.g., the BVH hit map 1002). At 1108, the apparatus may fetch the determined BVH hit map entry from the BVH hit map. At 1110, the apparatus may determine whether the BVH hit map entry is valid. For example, the apparatus may determine whether the validity indication 1008 indicates that the BVH hit map entry 1006 is valid.

Upon negative determination, at 1112, the apparatus may begin traversing the BVH from a root node of the BVH based on a ray in a set of rays. At 1114, the apparatus may determine whether traversal of the BVH from the root node produced a hit for the ray. Upon negative determination, at 1116, the apparatus may report a miss. At 1118, the apparatus may end tracing for the ray.

Returning back to 1110, upon positive determination that the BVH hit map entry is valid, at 1120, the apparatus may begin traversing the BVH from a node indicated by the BVH hit map entry ("Hit Map Node"). In an example, the apparatus may begin traversing the BVH based on the BVH node identifier 1010 of the BVH hit map entry 1006. At 1122, the apparatus may determine whether traversal of the BVH from the node indicated by the BVH hit map entry produced a hit. Upon positive determination, at 1124, the apparatus may report a hit. The apparatus may end ray tracing at 1118.

Returning to 1122, upon negative determination, the apparatus may return to 1112, that is, the apparatus may begin BVH traversal from a root node of the BVH (and perform subsequent actions described above and below in the description of FIG. 11). For instance, at 1114, the apparatus may determine whether traversal of the BVH from the root node produced a hit for the ray. Upon positive determination, at 1126, the apparatus may determine whether a pixel associated with the hit is a provoking pixel. Upon negative determination, at 1124, the apparatus may report a hit. The apparatus may end ray tracing at 1118.

Returning to 1126, upon positive determination, at 1128, the apparatus may update an entry of the BVH hit map to include last known intersection information. For instance, the apparatus may modify an entry in the BVH hit map entries 1004 to indicate that the entry is valid and the apparatus may modify the entry in the BVH hit map entries 1004 to include an identifier of a node of the BVH. At 1124, the apparatus may report a hit. The apparatus may end ray tracing at 1118. The report of the hit or the miss for the ray may be used for pixel shading purposes. For instance, if a hit is reported (i.e., if the ray intersects a primitive), the apparatus may shade a pixel based on intersection information associated with the hit. The apparatus may output the shaded pixel for display on a display panel (e.g., the display(s) 131).

Figure 12:
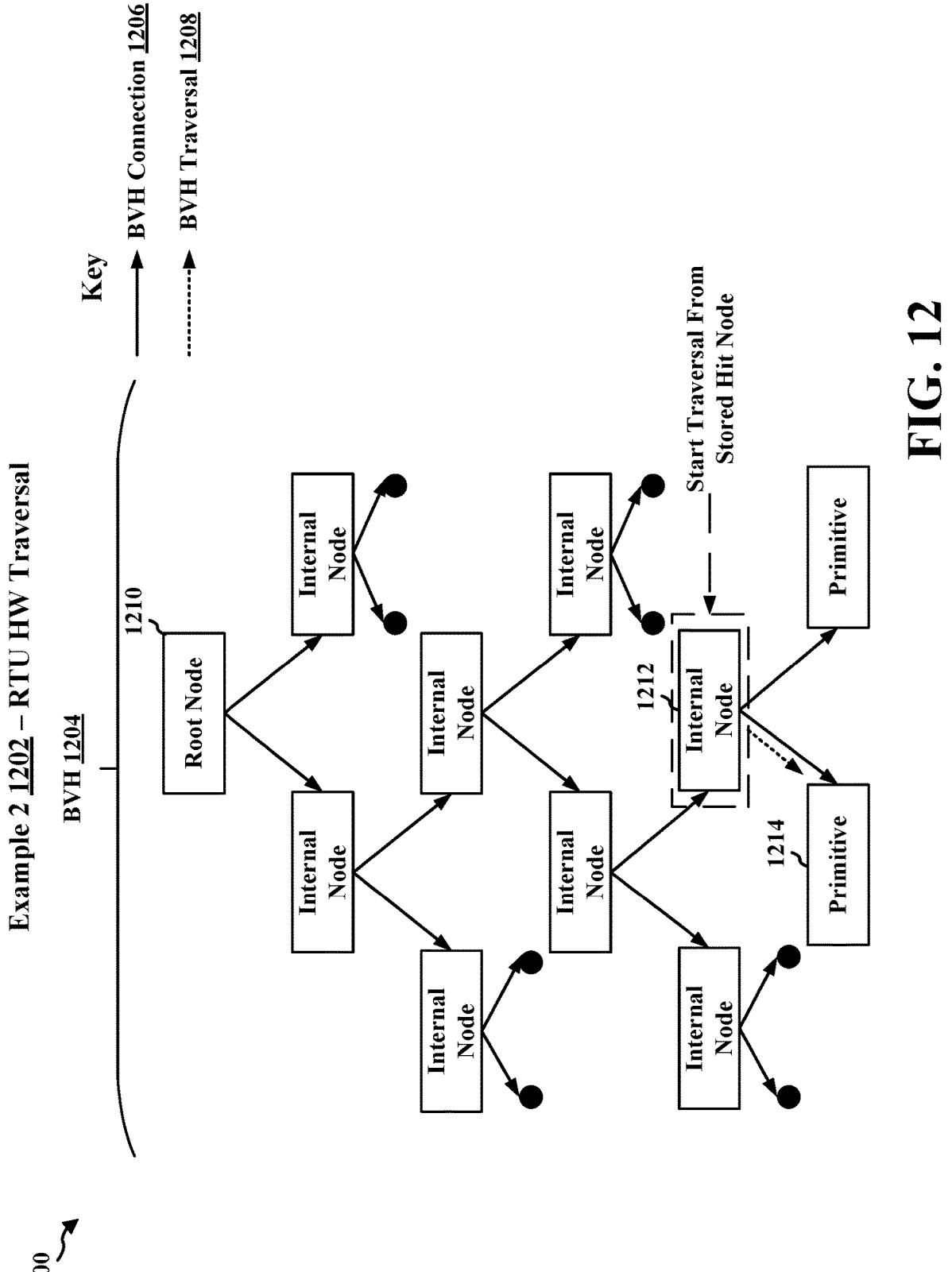
FIG. 12 is a diagram illustrating a second example of a traversal of a BVH by RTU hardware in accordance with one or more techniques of this disclosure.

FIG. 12 is a diagram 1200 illustrating a second example 1202 of a traversal of a BVH 1204 by RTU hardware in accordance with one or more techniques of this disclosure. The traversal of the BVH 1204 in the second example 1202 may correspond to the second example 1102 of BVH traversal logic described above in the description of FIG. 11. An apparatus (e.g., an RTU of a GPU) may generate the BVH 1204 as part of a ray tracing process. In an example, the BVH 1204 may be or include the binary bounding volume hierarchy 710. In the diagram 1200, a BVH connection 1206 is indicated by a solid line with an arrow and a BVH traversal 1208 is indicated by a dotted line. In an example, the BVH 1204 may include a root node 1210, internal nodes, an internal node 1212, a leaf node 1214 (labelled in FIG. 12 as "Primitive"), additional internal nodes, and additional leaf nodes. In FIG. 12, darkened circles may represent an internal node or a leaf node.

As described above in the description of FIG. 11, at 1112, an apparatus (e.g., an RTU of a GPU) may begin a traversal of the BVH 1204 from the root node 1210, where the traversal is for a first ray. In an example, the traversal may proceed to internal node 1212, where a hit occurs. In an example, no further hits occur after the apparatus traverses to internal node 1212. In an example, a pixel associated with the hit is a provoking pixel. The apparatus may update an entry in a BVH hit map to indicate that the entry is valid and to include an identifier for the internal node 1212.

Subsequently, the apparatus may begin, for a second ray, a traversal of the BVH 1204 from internal node 1212 based on an entry (e.g., the BVH hit map entry 1006) in a BVH hit map (e.g., the BVH hit map 1002) being valid (e.g., corresponding to 1110 in FIG. 11). The apparatus may (e.g., via a ray-triangle intersection test) determine that the second ray intersects a volume associated with the leaf node 1214 (e.g., corresponding to 1122 in FIG. 11). When the ray intersects the volume associated with the leaf node 1214, the apparatus may report a hit (e.g., corresponding to 1124 in FIG. 11). In some aspects, when the ray intersects the volume associated with the leaf node 1214, the apparatus may store an indication of a hit (e.g., corresponding to 1124 in FIG. 11), which the apparatus may or may not report at a later time.

As noted above, the apparatus may begin traversal of the BVH 1204 from the internal node 1212 (as opposed to root node 1210). The traversal may continue until (1) the apparatus determines that the ray does not intersect a volume (or a primitive) associated with any child nodes of a node of the BVH 1204 (i.e., "report miss") or (2) the apparatus determines that the ray intersects a volume corresponding to a leaf node, where the leaf node corresponds to a primitive in a scene (i.e., "report hit"). In an example, the apparatus may determine that the ray intersects a volume corresponding to the leaf node 1214. If traversal of the BVH 1204 from the internal node 1212 does not produce a hit, the apparatus may traverse the BVH 1204 from the root node 1210 (corresponding to 1122 and 1112 in FIG. 11). In comparison to the first example 902, traversing the BVH 1204 in the second example 1202 may be associated with reduced traversal times and/or reduced usage of computational resources of the apparatus.

Figure 13:
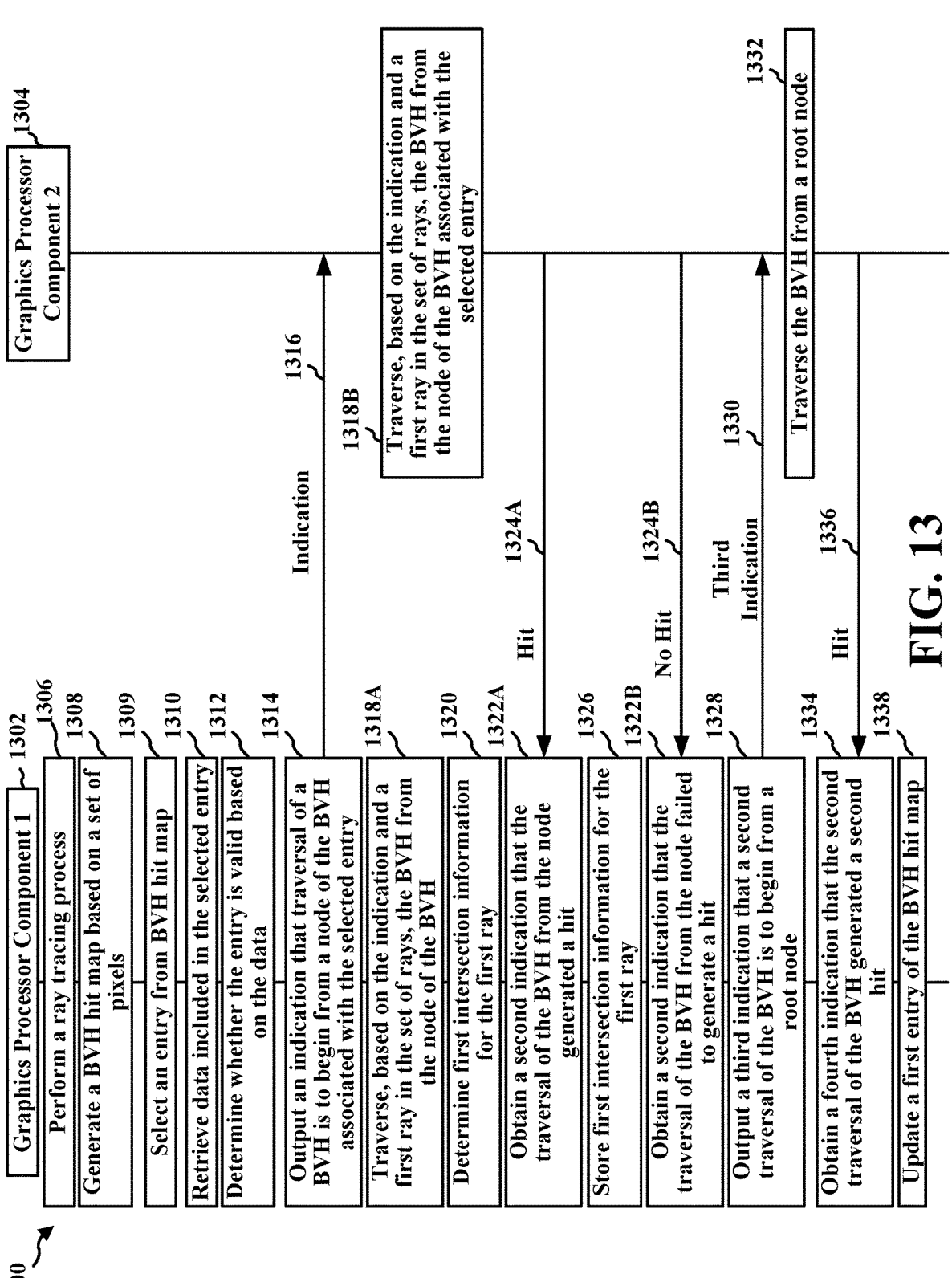
FIG. 13 is a call flow diagram illustrating example communications between a first graphics processor component and a second graphics processor component in accordance with one or more techniques of this disclosure.

FIG. 13 is a call flow diagram 1300 illustrating example communications between a first graphics processor component 1302 and a second graphics processor component 1304 in accordance with one or more techniques of this disclosure. In one example, the first graphics processor component 1302 and the second graphics processor component 1304 may both be graphics processor hardware. In another example, the first graphics processor component 1302 may be graphics processor software and the second graphics processor component 1304 may be graphics processor hardware. In a further example, the first graphics processor component 1302 may be graphics processor driver software. In yet another example, the second graphics processor component 1304 may be ray tracing hardware. In an example, the first graphics processor component 1302 and the second graphics processor component 1304 may be included in the device 104.

At 1308, the first graphics processor component 1302 may generate a BVH hit map based on a set of pixels, where the BVH hit map may include entries indicative of intersection information for a set of rays associated with the set of pixels, and where the BVH hit map may correspond to a BVH. At 1309, the first graphics processor component 1302 may select an entry from the entries of the BVH hit map based on pixel coordinate information for the set of pixels. At 1314, the first graphics processor component 1302 may output an indication that traversal of the BVH is to begin from a node of the BVH associated with the selected entry. For instance, in one aspect in which the first graphics processor component 1302 is software (e.g., driver software), at 1316, the first graphics processor component 1302 may transmit the indication to the second graphics processor component 1304.

At 1310, the first graphics processor component 1302 may retrieve data included in the selected entry (i.e., the entry selected at 1309), where the data is indicative of whether the selected entry is valid or invalid. At 1312, the first graphics processor component 1302 may determine whether the selected entry is valid based on the data, where outputting the indication at 1314 may be based on a determination that the selected entry is valid.

In one aspect in which the first graphics processor component 1302 is hardware, at 1318A, the first graphics processor component 1302 may traverse, based on the indication and a first ray in the set of rays, the BVH from the node of the BVH associated with the selected entry (i.e., the entry selected at 1309). In one aspect in which the first graphics processor component 1302 is software (e.g., driver software), at 1318B, the second graphics processor component 1304 may traverse, based on the indication (received at 1318B) and a first ray in the set of rays, the BVH from the node of the BVH associated with the selected entry (i.e., the entry selected at 1309). At 1320, the first graphics processor component 1302 may determine, based on the traversal (either performed by the first graphics processor component 1302 or the second graphics processor component 1304) and based on the first ray intersecting a first primitive associated with a first node of the BVH, first intersection information for the first ray.

At 1322A, the first graphics processor component 1302 may obtain a second indication that the traversal of the BVH from the node generated a hit, where the traversal of the BVH generates the hit when a first ray intersects a first primitive associated with a first node of the BVH. For instance, at 1324A, the first graphics processor component 1302 may obtain the second indication from the second graphics processor component 1304. At 1326, the first graphics processor component 1302 may store first intersection information for the first ray based on the second indication that the traversal of the BVH from the node generated the hit.

At 1322B, the first graphics processor component 1302 may obtain a second indication that the traversal of the BVH from the node failed to generate a hit, where the traversal of the BVH fails to generate the hit when a first ray fails to intersect a primitive or a bounding volume associated with the BVH. For instance, at 1324B, the first graphics processor component 1302 may obtain the second indication from the second graphics processor component 1304. At 1328, the first graphics processor component 1302 may output, based on the second indication that the traversal of the BVH failed to generate the hit, a third indication that a second traversal of the BVH is to begin from a root node of the BVH. For instance, at 1330, the first graphics processor component 1302 may transmit the third indication to the second graphics processor component 1304. At 1332, the second graphics processor may traverse the BVH from a root node of the BVH. At 1334, the first graphics processor component 1302 may obtain a fourth indication that the second traversal of the BVH generated a second hit, where the second traversal of the BVH generates the second hit when the first ray intersects a first primitive associated with a first node of the BVH. For instance, at 1336, the first graphics processor component 1302 may obtain the fourth indication from the second graphics processor component 1304. At 1338, the first graphics processor component 1302 may update a first entry of the BVH hit map based on the second hit being associated with the pixel, where the first entry is associated with the first node. At 1306, the first graphics processor component 1302 may perform a ray tracing process, where generating the BVH hit map at 1308, selecting the entry from the entries of the BVH hit map at 1309, and outputting the indication at 1314 occur during the performance of the ray tracing process.

FIG. 14 is a flowchart 1400 of an example method of graphics processing in accordance with one or more techniques of this disclosure. The method may be performed by an apparatus, such as an apparatus for graphics processing, a graphics processor (e.g., a GPU), a ray tracing unit (RTU), a CPU, a wireless communication device, the device 104, and the like, as used in connection with the aspects of FIGS. 1-3, 4A, 4B, 5, 6A, 6B, 7A, 7B, and 8-13. The method may be associated with various advantages, such as faster BVH traversals of first-hit rays, which may improve performance of ray tracing workloads and reduce memory bottlenecks. In an example, the method may be performed by the BVH hit map generator 198.

At 1402, the apparatus (e.g., a GPU) generates a BVH hit map based on a set of pixels, where the BVH hit map includes entries indicative of intersection information for a set of rays associated with the set of pixels, and where the BVH hit map corresponds to a BVH. For example, FIG. 13 at 1308 shows that the first graphics processor component 1302 may generate a BVH hit map based on a set of pixels, where the BVH hit map may include entries indicative of intersection information for a set of rays associated with the set of pixels. In an example, the BVH hit map may be or include the BVH hit map 1002. In an example, the set of pixels may include the provoking pixel 1014. In an example, the set of pixels may be or include the pixel block 1012. In an example, the entries may be or include BVH hit map entries 1004. In an example, the set of rays may include rays referenced above in the description of FIG. 3 and/or FIG. 4B. In an example, 1402 may be performed by the BVH hit map generator 198.

At 1404, the apparatus (e.g., a GPU) selects an entry from the entries of the BVH hit map based on pixel coordinate information for the set of pixels. For example, FIG. 13 at 1309 shows that the first graphics processor component 1302 may select an entry from the entries of the BVH hit map based on pixel coordinate information for the set of pixels. In an example, the entry may be the BVH hit map entry 1006. In an example, the pixel coordinate information may include coordinates of the pixel block 1012. In a further example, selecting the entry from the entries may correspond to 1106 in FIG. 11. In an example, 1404 may be performed by the BVH hit map generator 198.

At 1406, the apparatus (e.g., a GPU) traverses the BVH from a node of the BVH associated with the selected entry. For example, FIG. 13 at 1318A shows that the first graphics processor component 1302 may traverse the BVH from a node of the BVH associated with the selected entry. In an example, the BVH may be or include the BVH 1204, the binary bounding volume hierarchy 710, and/or the wide bounding volume hierarchy 760. In an example, the node may be the internal node 1212. Furthermore, traversal of the BVH beginning from the node of the BVH associated with the selected entry may correspond to 1120 in FIG. 11. In an example, 1406 may be performed by the BVH hit map generator 198.

FIG. 15 is a flowchart 1500 of an example method of graphics processing in accordance with one or more techniques of this disclosure. The method may be performed by an apparatus, such as an apparatus for graphics processing, a graphics processor (e.g., a GPU), a ray tracing unit (RTU), a CPU, the device 104, a wireless communication device, and the like, as used in connection with the aspects of FIGS. 1-3, 4A, 4B, 5, 6A, 6B, 7A, 7B, and 8-13. The method may be associated with various advantages, such as faster BVH traversals of first-hit rays, which may improve performance of ray tracing workloads and reduce memory bottlenecks. In an example, the method (including the various aspects detailed below) may be performed by the BVH hit map generator 198.

At 1504, the apparatus (e.g., a GPU) generates a BVH hit map based on a set of pixels, where the BVH hit map includes entries indicative of intersection information for a set of rays associated with the set of pixels, and where the BVH hit map corresponds to a BVH. For example, FIG. 13 at 1308 shows that the first graphics processor component 1302 may generate a BVH hit map based on a set of pixels, where the BVH hit map may include entries indicative of intersection information for a set of rays associated with the set of pixels. In an example, the BVH hit map may be or include the BVH hit map 1002. In an example, the set of pixels may include the provoking pixel 1014. In an example, the set of pixels may be or include the pixel block 1012. In an example, the entries may be or include BVH hit map entries 1004. In an example, the set of rays may include rays referenced above in the description of FIG. 3 and/or FIG. 4B. In an example, 1504 may be performed by the BVH hit map generator 198.

At 1506, the apparatus (e.g., a GPU) selects an entry from the entries of the BVH hit map based on pixel coordinate information for the set of pixels. For example, FIG. 13 at 1309 shows that the first graphics processor component 1302 may select an entry from the entries of the BVH hit map based on pixel coordinate information for the set of pixels. In an example, the entry may be the BVH hit map entry 1006. In an example, the pixel coordinate information may include coordinates of the pixel block 1012. In a further example, selecting the entry from the entries may correspond to 1106 in FIG. 11. In an example, 1506 may be performed by the BVH hit map generator 198

At 1512, the apparatus (e.g., a GPU) traverses the BVH from a node of the BVH associated with the selected entry. For example, FIG. 13 at 1318A shows that the first graphics processor component 1302 may traverse the BVH from a node of the BVH associated with the selected entry. In an example, the BVH may be or include the BVH 1204, the binary bounding volume hierarchy 710, and/or the wide bounding volume hierarchy 760. In an example, the node may be the internal node 1212. Furthermore, traversal of the BVH beginning from the node of the BVH associated with the selected entry may correspond to 1120 in FIG. 11. In an example, 1512 may be performed by the BVH hit map generator 198.

In one aspect, at 1508, the apparatus (e.g., a GPU) may retrieve data included in the selected entry, where the data may be indicative of whether the selected entry is valid or invalid. For example, FIG. 13 at 1310 shows that the first graphics processor component 1302 may retrieve data included in the selected entry, where the data may be indicative of whether the selected entry is valid or invalid. In an example, the data may be or include the validity indication 1008. In an example, the aforementioned aspect may correspond to 1108 in FIG. 11. In an example, 1508 may be performed by the BVH hit map generator 198.

In one aspect, at 1510, the apparatus (e.g., a GPU) may determine whether the selected entry is valid based on the data, where traversing the BVH may be based on a determination that the selected entry is valid. For example, FIG. 13 at 1312 shows that the first graphics processor component 1302 may determine whether the selected entry is valid based on the data, where traversing the BVH at 1318A may be based on a determination that the selected entry is valid. For example, the aforementioned aspect may correspond to 1110 in FIG. 11. In an example, 1510 may be performed by the BVH hit map generator 198.

In one aspect, the data may indicate that the selected entry is invalid based on one of: a first indication from a driver, a second indication from graphics processing hardware, or the selected entry not being associated with prior intersection information. For example, the data retrieved at 1310 may indicate that the selected entry is invalid based on one of: a first indication from a driver, a second indication from graphics processing hardware, or the selected entry not being associated with prior intersection information. A driver may refer to a collection of software used to translate a set of application programming interface (API) commands that may be used to program graphics processor hardware (e.g., GPU hardware).

In one aspect, the BVH may include a plurality of nodes arranged in a plurality of layers, where each node in the plurality of nodes may be connected to at least one other node in a different layer by at least one edge, and where each node may be associated with a bounding volume or a primitive. For example, FIG. 7A, FIG. 7B, and FIG. 12 show that the BVH may include a plurality of nodes arranged in a plurality of layers, where each node in the plurality of nodes may be connected to at least one other node in a different layer by at least one edge, and where each node may be associated with a bounding volume or a primitive.

In one aspect, traversing the BVH may include traversing, based on a first ray in the set of rays, the BVH from the node of the BVH associated with the selected entry. For example, FIG. 13 at 1318A shows that the first graphics processor component 1302 may traverse, based on a first ray in the set of rays, the BVH from the node of the BVH associated with the selected entry. In an example, the first ray may be a ray referenced above in the description of FIG. 3 and/or FIG. 4B. In an example, the aforementioned aspect may correspond to 1120 in FIG. 11.

In one aspect, the set of pixels may include a provoking pixel, and generating the BVH hit map based on the set of pixels may include generating the BVH hit map based on the provoking pixel. For example, generating the BVH hit map at 1308 may include generating the BVH hit map based on a provoking pixel. In an example, the provoking pixel may be the provoking pixel 1014.

In one aspect, at 1516, the apparatus (e.g., a GPU) may determine, based on the traversal and based on the first ray intersecting a first primitive associated with a first node of the BVH, first intersection information for the first ray. For example, FIG. 13 at 1320 shows that the first graphics processor component 1302 may determine, based on the traversal and based on the first ray intersecting a first primitive associated with a first node of the BVH, first intersection information for the first ray. In an example, the first primitive may be a primitive described above in connection with FIG. 7A or FIG. 7B. In an example, 1516 may be performed by the BVH hit map generator 198.

In one aspect, at 1518, the apparatus (e.g., a GPU) may obtain a first indication that the traversal of the BVH from the node generated a hit, where the traversal of the BVH may generate the hit when a first ray intersects a first primitive associated with a first node of the BVH. For example, FIG. 13 at 1322A shows that the first graphics processor component 1302 may obtain a first indication that the traversal of the BVH from the node generated a hit, where the traversal of the BVH may generate the hit when a first ray intersects a first primitive associated with a first node of the BVH. In an example, the aforementioned aspect may correspond to 1124 in FIG. 11. In an example, 1518 may be performed by the BVH hit map generator 198.

In one aspect, at 1520, the apparatus (e.g., a GPU) may store first intersection information for the first ray based on the first indication that the traversal of the BVH from the node generated the hit. For example, FIG. 13 at 1326 shows that the first graphics processor component 1302 may store first intersection information for the first ray based on the first indication that the traversal of the BVH from the node generated the hit. In an example, 1520 may be performed by the BVH hit map generator 198.

In one aspect, at 1522, the apparatus (e.g., a GPU) may obtain a first indication that the traversal of the BVH from the node failed to generate a hit, where the traversal of the BVH may fail to generate the hit when a first ray fails to intersect a primitive or a bounding volume associated with the BVH. For example, FIG. 13 at 1322B shows that the first graphics processor component 1302 may obtain a first indication that the traversal of the BVH from the node failed to generate a hit, where the traversal of the BVH may fail to generate the hit when a first ray fails to intersect a primitive or a bounding volume associated with the BVH. In an example, the aforementioned aspect may correspond to 1122 in FIG. 11. In an example, 1522 may be performed by the BVH hit map generator 198.

In one aspect, at 1524, the apparatus (e.g., a GPU) may output, based on the first indication that the traversal of the BVH failed to generate the hit, a second indication that a second traversal of the BVH is to begin from a root node of the BVH. For example, FIG. 13 at 1328 shows that the first graphics processor component 1302 may output, based on the first indication that the traversal of the BVH failed to generate the hit, a second indication that a second traversal of the BVH is to begin from a root node of the BVH. In an example, the root node may be the root node 1210. In an example, the aforementioned aspect may correspond to 1112 in FIG. 11. In an example, 1524 may be performed by the BVH hit map generator 198.

In one aspect, at 1526, the apparatus (e.g., a GPU) may obtain a third indication that the second traversal of the BVH generated a second hit, where the second traversal of the BVH may generate the second hit when the first ray intersects a first primitive associated with a first node of the BVH. For example, FIG. 13 at 1334 shows the first graphics processor component 1302 may obtain a third indication that the second traversal of the BVH generated a second hit, where the second traversal of the BVH may generate the second hit when the first ray intersects a first primitive associated with a first node of the BVH. In an example, the aforementioned aspect may correspond to 1116. In an example, 1526 may be performed by the BVH hit map generator 198.

In one aspect, at 1528, the apparatus (e.g., a GPU) may update a first entry of the BVH hit map based on the second hit being associated with the pixel, where the first entry may be associated with the first node. For example, FIG. 13 at 1338 shows that the first graphics processor component 1302 may update a first entry of the BVH hit map based on the second hit being associated with the pixel, where the first entry may be associated with the first node. In an example, the aforementioned aspect may correspond to 1128 in FIG. 11. In an example, the first entry may be an entry in the BVH hit map entries 1004. In an example, 1528 may be performed by the BVH hit map generator 198.

In one aspect, traversing the BVH may include: traversing, via ray tracing hardware, the BVH from the node of the BVH associated with the selected entry. For example, traversing the BVH at 1318A may include traversing, via ray tracing hardware, the BVH from the node of the BVH associated with the selected entry. Ray tracing hardware may refer to hardware (e.g., hardware in a GPU) that is configured to perform a ray tracing process.

In one aspect, at 1514, the apparatus (e.g., a GPU) may store an indication that the traversal of the BVH is to begin from the node of the BVH associated with the selected entry. For example, outputting the indication at 1314 may include storing (e.g., in memory, a buffer, a cache, etc.) an indication that the traversal of the BVH is to begin from the node of the BVH associated with the selected entry. In an example, 1514 may be performed by the BVH hit map generator 198.

In one aspect, the pixel coordinate information may include a set of N×M pixel blocks, where N may be a first positive integer, and where M may be a second positive integer. For example, FIG. 10 shows that the pixel coordinate information may include a set of N×M pixel blocks, where N may be a first positive integer, and where M may be a second positive integer.

In one aspect, the set of pixels may include a set of neighboring pixels. For example, FIG. 10 shows that the set of pixels may include a set of neighboring pixels.

In one aspect, at 1502, the apparatus (e.g., a GPU) may perform a ray tracing process, where generating the BVH hit map, selecting the entry from the entries of the BVH hit map, and traversing the BVH may occur during the performance of the ray tracing process. For example, FIG. 13 at 1306 shows that the first graphics processor component 1302 may perform a ray tracing process, where generating the BVH hit map at 1308, selecting the entry from the entries of the BVH hit map at 1309, and traversing the BVH at 1318A may occur during the performance of the ray tracing process. In an example, the ray tracing process may include aspects described above in connection with FIG. 3, FIG. 4B, FIG. 5, FIG. 6A, FIG. 6B, FIG. 7A, and/or FIG. 7B. In an example, 1502 may be performed by the BVH hit map generator 198.

In one aspect, the set of rays may include a set of first-hit rays. For example, FIG. 11 shows that the set of rays may include a set of first-hit rays.

In one aspect, the node of the BVH associated with the selected entry may be a non-root node. For example, the node of the BVH associated with the selected entry may be the internal node 1212 (i.e., a non-root node).

In configurations, a method or an apparatus for graphics processing is provided. The apparatus may be a GPU, a CPU, or some other processor that may perform graphics processing. In aspects, the apparatus may be the processing unit 120 within the device 104, or may be some other hardware within the device 104 or another device. The apparatus may include means for generating a bounding volume hierarchy (BVH) hit map based on a set of pixels, where the BVH hit map includes entries indicative of intersection information for a set of rays associated with the set of pixels, and where the BVH hit map corresponds to a BVH. The apparatus may further include means for selecting an entry from the entries of the BVH hit map based on pixel coordinate information for the set of pixels. The apparatus may further include means for outputting an indication that traversal of the BVH is to begin from the node of the BVH associated with the selected entry. The apparatus may further include means for traversing the BVH from the node of the BVH associated with the selected entry. The apparatus may further include means for retrieving data included in the selected entry, where the data is indicative of whether the selected entry is valid or invalid. The apparatus may further include means for determining whether the selected entry is valid based on the data, where traversing the BVH is based on a determination that the selected entry is valid. The apparatus may further include means for traversing, based on a first ray in the set of rays, the BVH from the node of the BVH associated with the selected entry. The apparatus may further include means for determining, based on the traversal and based on the first ray intersecting a first primitive associated with a first node of the BVH, first intersection information for the first ray. The apparatus may further include means for obtaining a first indication that the traversal of the BVH from the node generated a hit, where the traversal of the BVH generates the hit when a first ray intersects a first primitive associated with a first node of the BVH. The apparatus may further include means for storing first intersection information for the first ray based on the first indication that the traversal of the BVH from the node generated the hit. The apparatus may further include means for obtaining a first indication that the traversal of the BVH from the node failed to generate a hit, where the traversal of the BVH fails to generate the hit when a first ray fails to intersect a primitive or a bounding volume associated with the BVH. The apparatus may further include means for outputting, based on the first indication that the traversal of the BVH failed to generate the hit, a second indication that a second traversal of the BVH is to begin from a root node of the BVH. The apparatus may further include means for obtaining a third indication that the second traversal of the BVH generated a second hit, where the second traversal of the BVH generates the second hit when the first ray intersects a first primitive associated with a first node of the BVH. The apparatus may further include means for updating a first entry of the BVH hit map based on the second hit being associated with the pixel, where the first entry is associated with the first node. The apparatus may further include means for performing a ray tracing process, where generating the BVH hit map, selecting the entry from the entries of the BVH hit map, and traversing the BVH occur during the performance of the ray tracing process.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, where reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for." Unless stated otherwise, the phrase "a processor" may refer to "any of one or more processors" (e.g., one processor of one or more processors, a number (greater than one) of processors in the one or more processors, or all of the one or more processors) and the phrase "a memory" may refer to "any of one or more memories" (e.g., one memory of one or more memories, a number (greater than one) of memories in the one or more memories, or all of the one or more memories).

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may include RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of graphics processing, comprising: generating a bounding volume hierarchy (BVH) hit map based on a set of pixels, wherein the BVH hit map includes entries indicative of intersection information for a set of rays associated with the set of pixels, wherein the BVH hit map corresponds to a BVH; selecting an entry from the entries of the BVH hit map based on pixel coordinate information for the set of pixels; and traversing the BVH from a node of the BVH associated with the selected entry.

Aspect 2 may be combined with aspect 1, further comprising: retrieving data included in the selected entry, wherein the data is indicative of whether the selected entry is valid or invalid; and determining whether the selected entry is valid based on the data, wherein traversing the BVH is based on a determination that the selected entry is valid.

Aspect 3 may be combined with aspect 2, wherein the data indicates that the selected entry is invalid based on one of: a first indication from a driver, a second indication from graphics processing hardware, or the selected entry not being associated with prior intersection information.

Aspect 4 may be combined with any of aspects 1-3, wherein the set of pixels comprises a provoking pixel, and wherein generating the BVH hit map based on the set of pixels comprises generating the BVH hit map based on the provoking pixel.

Aspect 5 may be combined any of aspects 1-4, wherein the BVH includes a plurality of nodes arranged in a plurality of layers, wherein each node in the plurality of nodes is connected to at least one other node in a different layer by at least one edge, and wherein each node is associated with a bounding volume or a primitive, wherein traversing the BVH comprises: traversing, based on a first ray in the set of rays, the BVH from the node of the BVH associated with the selected entry.

Aspect 6 may be combined with aspect 5, further comprising: determining, based on the traversal and based on the first ray intersecting a first primitive associated with a first node of the BVH, first intersection information for the first ray.

Aspect 7 may be combined with any of aspects 1-6, further comprising: obtaining a first indication that the traversal of the BVH from the node generated a hit, wherein the traversal of the BVH generates the hit when a first ray intersects a first primitive associated with a first node of the BVH; and storing first intersection information for the first ray based on the first indication that the traversal of the BVH from the node generated the hit.

Aspect 8 may be combined with any of aspects 1-6, further comprising: obtaining a first indication that the traversal of the BVH from the node failed to generate a hit, wherein the traversal of the BVH fails to generate the hit when a first ray fails to intersect a primitive or a bounding volume associated with the BVH; and outputting, based on the first indication that the traversal of the BVH failed to generate the hit, a second indication that a second traversal of the BVH is to begin from a root node of the BVH.

Aspect 9 may be combined with aspect 8, further comprising: obtaining a third indication that the second traversal of the BVH generated a second hit, wherein the second traversal of the BVH generates the second hit when the first ray intersects a first primitive associated with a first node of the BVH; and updating a first entry of the BVH hit map based on the second hit being associated with the pixel, wherein the first entry is associated with the first node.

Aspect 10 may be combined with any of aspects 1-9, wherein traversing the BVH comprises: traversing, via ray tracing hardware, the BVH from the node of the BVH associated with the selected entry.

Aspect 11 may be combined with any of aspects 1-10, further comprising: storing an indication that traversal of the BVH is to begin from the node of the BVH associated with the selected entry.

Aspect 12 may be combined with any of aspects 1-11, wherein the pixel coordinate information includes a set of N×M pixel blocks, wherein N is a first positive integer, and wherein M is a second positive integer.

Aspect 13 may be combined with any of aspects 1-12, wherein the set of pixels includes a set of neighboring pixels.

Aspect 14 may be combined with any of aspects 1-13, further comprising: performing a ray tracing process, wherein generating the BVH hit map, selecting the entry from the entries of the BVH hit map, and traversing the BVH occur during the performance of the ray tracing process.

Aspect 15 may be combined with any of aspects 1-14, wherein the set of rays includes a set of first-hit rays.

Aspect 16 may be combined with any of aspects 1-15, wherein the node of the BVH associated with the selected entry is a non-root node.

Aspect 17 is an apparatus for graphics processing comprising a processor coupled to a memory and, based on information stored in the memory, the processor is configured to implement a method as in any of aspects 1-16.

Aspect 18 may be combined with aspect 17 and includes that the apparatus is a wireless communication device comprising at least one of a transceiver or an antenna.

Aspect 19 is an apparatus for graphics processing including means for implementing a method as in any of aspects 1-16.

Aspect 20 is a computer-readable medium (e.g., a non-transitory computer-readable medium) storing computer executable code, the computer executable code, when executed by a processor, causes the at least one processor to implement a method as in any of aspects 1-16.

Various aspects have been described herein. These and other aspects are within the scope of the following claims.

What is claimed is:

1. An apparatus for graphics processing, comprising:
a memory; and
a processor coupled to the memory and, based on information stored in the memory, the processor is configured to:
generate a bounding volume hierarchy (BVH) hit map based on a provoking pixel of a pixel block, wherein the BVH hit map comprises an entry indicative of intersection information for a ray associated with the provoking pixel, and wherein the BVH hit map corresponds to a BVH;
select, for a first pixel of the pixel block, the entry from the BVH hit map based on pixel coordinate information for the first pixel; and
traverse the BVH from a node of the BVH associated with the selected entry to determine whether a first ray associated with the first pixel generates a hit.

2. The apparatus of claim 1, wherein the processor is further configured to:
retrieve data included in the selected entry, wherein the data is indicative of whether the selected entry is associated with a non-root node of the BVH; and
determine whether the selected entry is associated with the non-root node of the BVH based on the data, wherein to traverse the BVH, the processor is configured to traverse the BVH based on a determination that the selected entry is associated with the non-root node of the BVH.

3. The apparatus of claim 2, wherein the data indicates that the selected entry is not associated with the non-root node of the BVH based on one of: a first indication from a driver, a second indication from graphics processing hardware, or the selected entry not being associated with prior intersection information.

4. The apparatus of claim 1, wherein to generate the BVH hit map based on the provoking pixel, the processor is configured to generate the selected entry of the BVH hit map based on a traversal of the BVH for the ray associated with the provoking pixel.

5. The apparatus of claim 1, wherein the BVH comprises a plurality of nodes arranged in a plurality of layers, wherein each node in the plurality of nodes is connected to at least one other node in a different layer by at least one edge, and wherein each node is associated with a bounding volume or a primitive, and wherein to traverse the BVH, the processor is configured to:
traverse, based on the first ray associated with the first pixel, the BVH from the node of the BVH associated with the selected entry.

6. The apparatus of claim 5, wherein the processor is further configured to:
determine, based on the traversal and based on the first ray intersecting a first primitive associated with a first node of the BVH, first intersection information for the first ray.

7. The apparatus of claim 1, wherein the processor is further configured to:
obtain a first indication that the traversal of the BVH from the node generated the hit, wherein the traversal of the BVH generates the hit when the first ray intersects a first primitive associated with a first node of the BVH; and
store first intersection information for the first ray based on the first indication that the traversal of the BVH from the node generated the hit.

8. The apparatus of claim 1, wherein the processor is further configured to:
obtain a first indication that the traversal of the BVH from the node failed to generate the hit, wherein the traversal of the BVH fails to generate the hit when the first ray fails to intersect a primitive or a bounding volume associated with the BVH; and output, based on the first indication that the traversal of the BVH failed to generate the hit, a second indication that a second traversal of the BVH is to begin from a root node of the BVH.

9. The apparatus of claim 8, wherein the processor is further configured to:

obtain a third indication that the second traversal of the BVH generated a second hit, wherein the second traversal of the BVH generates the second hit when the first ray intersects a first primitive associated with a first node of the BVH; and update a first entry of the BVH hit map based on the second hit being associated with the first pixel, wherein the first entry is associated with the first node.

10. The apparatus of claim 1, wherein to traverse the BVH, the processor is configured to:

traverse, via ray tracing hardware, the BVH from the node of the BVH associated with the selected entry.

11. The apparatus of claim 1, wherein the processor is further configured to:

store an indication that traversal of the BVH is to begin from the node of the BVH associated with the selected entry.

12. The apparatus of claim 1, wherein the pixel block comprises a set of N×M pixels, wherein N is a first positive integer, and wherein M is a second positive integer.

13. The apparatus of claim 1, wherein the pixel block comprises a set of neighboring pixels.

14. The apparatus of claim 1, wherein the processor is further configured to:

perform a ray tracing process, wherein to generate the BVH hit map, select the entry from the entries of the BVH hit map, and traverse the BVH, the processor is configured to generate the BVH hit map, select the entry from the entries of the BVH hit map, and traverse the BVH during the performance of the ray tracing process.

15. The apparatus of claim 1, wherein the ray comprises a first-hit ray.

16. The apparatus of claim 1, wherein the node of the BVH associated with the selected entry is a non-root node.

17. The apparatus of claim 1, wherein the apparatus is a wireless communication device comprising at least one of a transceiver or an antenna.

18. A method of graphics processing, comprising:

generating a bounding volume hierarchy (BVH) hit map based on a provoking pixel of a pixel block, wherein the BVH hit map comprises an entry indicative of intersection information for a ray associated with the provoking pixel, and wherein the BVH hit map corresponds to a BVH;

selecting, for a first pixel of the pixel block, the entry of the BVH hit map based on pixel coordinate information for the first pixel; and traversing the BVH from a node of the BVH associated with the selected entry to determine whether a first ray associated with the first pixel generates a hit.

19. The method of claim 18, further comprising:

retrieving data included in the selected entry, wherein the data is indicative of whether the selected entry is associated with a non-root node of the BVH; and determining whether the selected entry is associated with the non-root node of the BVH based on the data, wherein traversing the BVH is based on a determination that the selected entry is associated with the non-root node of the BVH.

20. The method of claim 19, wherein the data indicates that the selected entry is not associated with the non-root node of the BVH based on one of: a first indication from a driver, a second indication from graphics processing hardware, or the selected entry not being associated with prior intersection information.

21. The method of claim 18, and wherein generating the BVH hit map based on the provoking pixel comprises generating the selected entry of the BVH hit map based on a traversal of the BVH for the ray associated with the provoking pixel.

22. The method of claim 18, wherein the BVH comprises a plurality of nodes arranged in a plurality of layers, wherein each node in the plurality of nodes is connected to at least one other node in a different layer by at least one edge, and wherein each node is associated with a bounding volume or a primitive, and wherein traversing the BVH comprises:

traversing, based on the first ray associated with the first pixel, the BVH from the node of the BVH associated with the selected entry.

23. The method of claim 22, further comprising:

determining, based on the traversal and based on the first ray intersecting a first primitive associated with a first node of the BVH, first intersection information for the first ray.

24. The method of claim 18, further comprising:

obtaining a first indication that the traversal of the BVH from the node generated the hit, wherein the traversal of the BVH generates the hit when the first ray intersects a first primitive associated with a first node of the BVH; and storing first intersection information for the first ray based on the first indication that the traversal of the BVH from the node generated the hit.

25. The method of claim 18, further comprising:

obtaining a first indication that the traversal of the BVH from the node failed to generate the hit, wherein the traversal of the BVH fails to generate the hit when the first ray fails to intersect a primitive or a bounding volume associated with the BVH; and outputting, based on the first indication that the traversal of the BVH failed to generate the hit, a second indication that a second traversal of the BVH is to begin from a root node of the BVH.

26. The method of claim 25, further comprising:

obtaining a third indication that the second traversal of the BVH generated a second hit, wherein the second traversal of the BVH generates the second hit when the first ray intersects a first primitive associated with a first node of the BVH; and updating a first entry of the BVH hit map based on the second hit being associated with the first pixel, wherein the first entry is associated with the first node.

27. The method of claim 18, wherein traversing the BVH comprises:

traversing, via ray tracing hardware, the BVH from the node of the BVH associated with the selected entry.

28. The method of claim 18, further comprising:

storing an indication that traversal of the BVH is to begin from the node of the BVH associated with the selected entry.

29. The method of claim 18, wherein the pixel block comprises a set of N×M pixels, wherein N is a first positive integer, and wherein M is a second positive integer.

30. A non-transitory computer-readable medium storing computer executable code, the computer executable code, when executed by a processor, causes the processor to:

generate a bounding volume hierarchy (BVH) hit map based on a provoking pixel of a pixel block, wherein the BVH hit map comprises an entry indicative of intersection information for a ray associated with the provoking pixel, and wherein the BVH hit map corresponds to a BVH;

select, for a first pixel of the pixel block, the entry of the BVH hit map based on pixel coordinate information for the first pixel; and traverse the BVH from a node of the BVH associated with the selected entry to determine whether a first ray associated with the first pixel generates a hit.

\* \* \* \* \*